(12) United States Patent
Zhang et al.

(10) Patent No.: US 12,651,044 B2
(45) Date of Patent: Jun. 9, 2026

(54) METHODS OF DEPLOYING BIG DATA CLUSTER AND BIG DATA CLUSTER BASED DATA PROCESSING METHODS

(71) Applicant: BOE Technology Group Co., Ltd., Beijing (CN)

(72) Inventors: Ning Zhang, Beijing (CN); Lin Fan, Beijing (CN); Rui Guan, Beijing (CN); Wen He, Beijing (CN); Xiao Chu, Beijing (CN); Xiang Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 320 days.

(21) Appl. No.: 18/559,787

(22) PCT Filed: Jul. 15, 2022

(86) PCT No.: PCT/CN2022/106091
§ 371 (c)(1),
(2) Date: Nov. 8, 2023

(87) PCT Pub. No.: WO2024/011627
PCT Pub. Date: Jan. 18, 2024

(65) Prior Publication Data
US 2025/0094537 A1 Mar. 20, 2025

(51) Int. Cl.
*G06F 3/0486* (2013.01)
*G06F 18/232* (2023.01)
*G06F 21/45* (2013.01)

(52) U.S. Cl.
CPC .......... *G06F 18/232* (2023.01); *G06F 3/0486* (2013.01); *G06F 21/45* (2013.01)

(58) Field of Classification Search
CPC ....... G06F 18/232; G06F 3/0486; G06F 21/45
See application file for complete search history.

(56) References Cited

U.S. PATENT DOCUMENTS

2016/0092059 A1* 3/2016 Tu ......................... G06F 16/252
715/738
2017/0142189 A1 5/2017 Cabrera et al.
(Continued)

FOREIGN PATENT DOCUMENTS

| CN | 102681781 A | 9/2012 |
| CN | 107070691 A | 8/2017 |

(Continued)

OTHER PUBLICATIONS

NPL_CN 108121773 A (Year: 2018).*
(Continued)

*Primary Examiner* — Ziaul A Chowdhury
(74) *Attorney, Agent, or Firm* — IPro, PLLC

(57) ABSTRACT

The present disclosure relates to a method of deploying a big data cluster. In the present disclosure, a deployment interface is provided, to provide a big data cluster deployment function through the deployment interface. The method includes: in response to a node creation operation in the deployment interface, displaying a to-be-deployed node in a temporary resource pool region in the deployment interface; in response to a drag-and-drop operation on the to-be-deployed node in the temporary resource pool region, displaying the to-be-deployed node in a physical pool in the deployment resource pool region in the deployment interface; and in response to a start deployment operation in the deployment interface, according to the physical pool where the to-be-deployed node is located, creating a container corresponding to the to-be-deployed node on a server corresponding to the physical pool, where the container is configured to provide a big data cluster service.

18 Claims, 17 Drawing Sheets

(56)                References Cited

U.S. PATENT DOCUMENTS

2017/0316114 A1    11/2017  Bourhani et al.
2019/0121541 A1     4/2019  Zhao et al.

FOREIGN PATENT DOCUMENTS

| | | | |
|---|---|---|---|
| CN | 107454140 A | | 12/2017 |
| CN | 108037919 A | | 5/2018 |
| CN | 108121773 A | * 6/2018 | .......... G06F 40/289 |
| CN | 109587199 A | | 4/2019 |
| CN | 109840253 A | | 6/2019 |
| CN | 110011827 A | | 7/2019 |
| CN | 111008197 A | | 4/2020 |
| CN | 111143465 A | | 5/2020 |
| CN | 111427949 A | * 7/2020 | |
| CN | 111736994 A | | 10/2020 |
| CN | 112084009 A | | 12/2020 |
| CN | 112181960 A | | 1/2021 |
| CN | 112511611 A | | 3/2021 |
| CN | 113704178 A | | 11/2021 |
| CN | 113835705 A | | 12/2021 |
| CN | 113886061 A | | 1/2022 |
| CN | 114003361 A | | 2/2022 |
| CN | 114443293 A | | 5/2022 |
| CN | 114443294 A | | 5/2022 |
| CN | 115129327 A | | 9/2022 |
| CN | 112099788 B | * 6/2024 | .............. G06F 8/38 |
| WO | 2021249242 A1 | | 12/2021 |

OTHER PUBLICATIONS

NPL_CN 111427949 A (Year: 2020).*
NPL_CN 112099788 B (Year: 2024).*
CN2022800022272 first office actin dated Apr. 27, 2026.

* cited by examiner

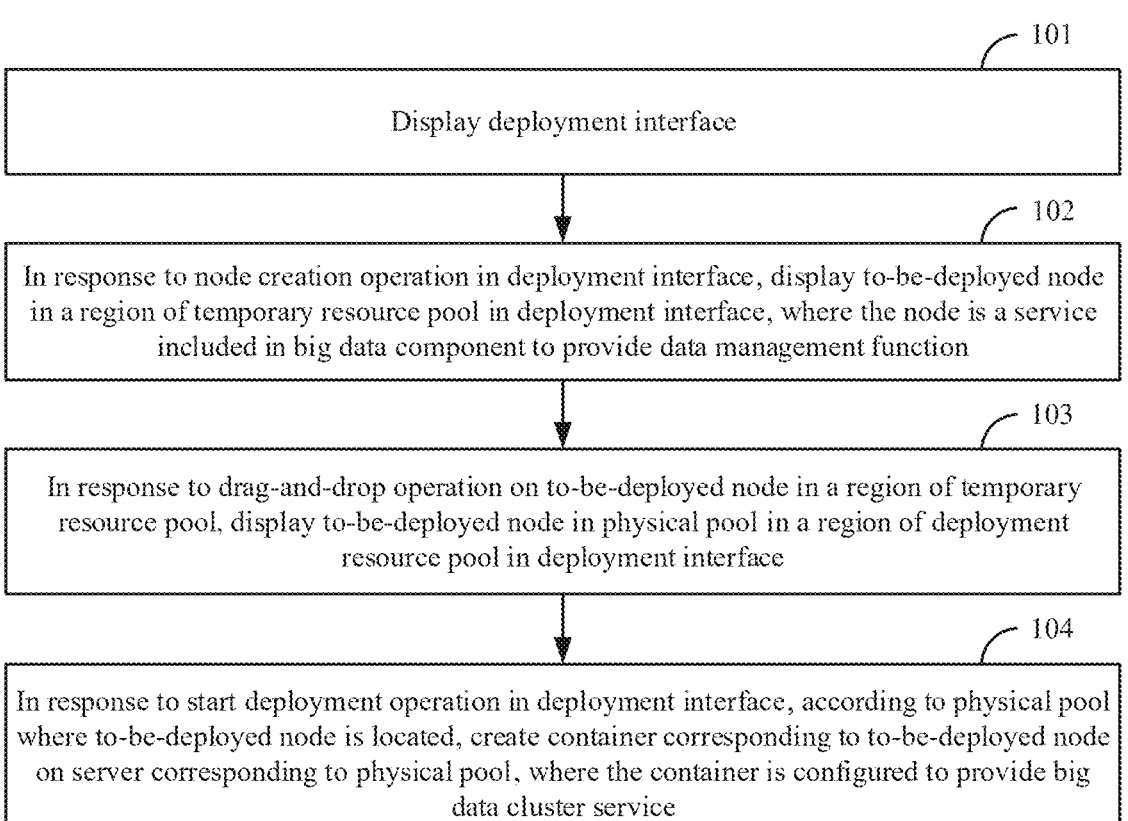

101

Display deployment interface

102

In response to node creation operation in deployment interface, display to-be-deployed node in a region of temporary resource pool in deployment interface, where the node is a service included in big data component to provide data management function

103

In response to drag-and-drop operation on to-be-deployed node in a region of temporary resource pool, display to-be-deployed node in physical pool in a region of deployment resource pool in deployment interface

104

In response to start deployment operation in deployment interface, according to physical pool where to-be-deployed node is located, create container corresponding to to-be-deployed node on server corresponding to physical pool, where the container is configured to provide big data cluster service

FIG. 1

Example 3                    Example 4: deployment result of example 3

Deploy

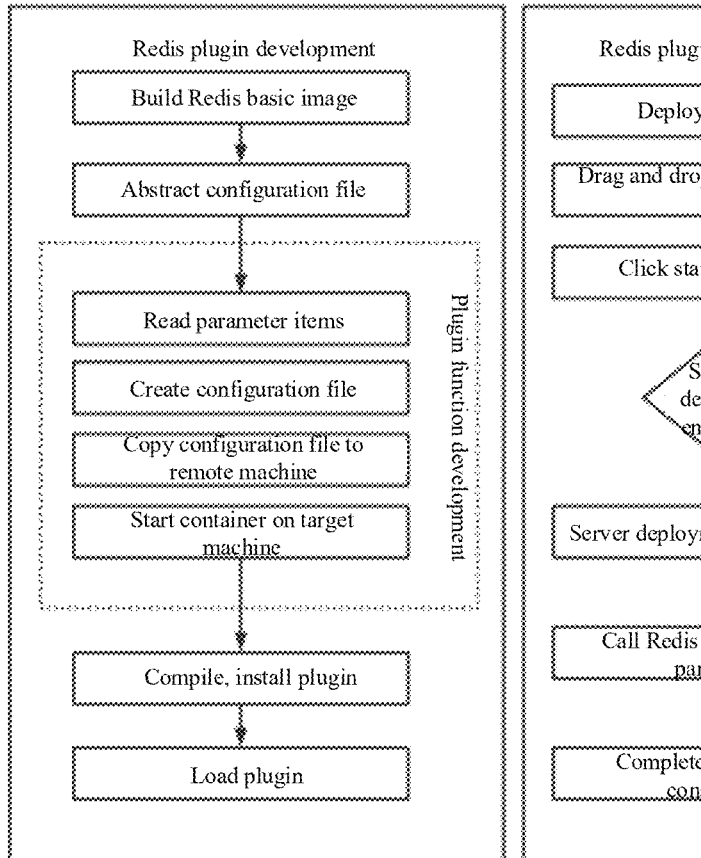
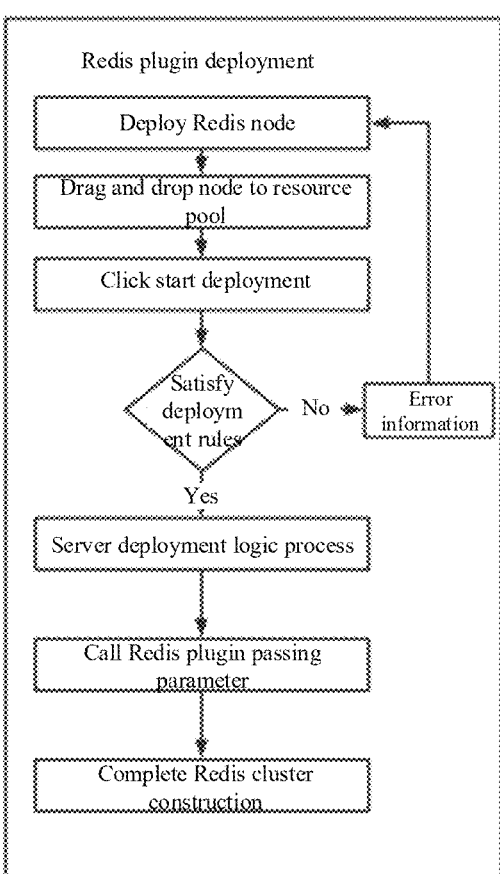

FIG. 15

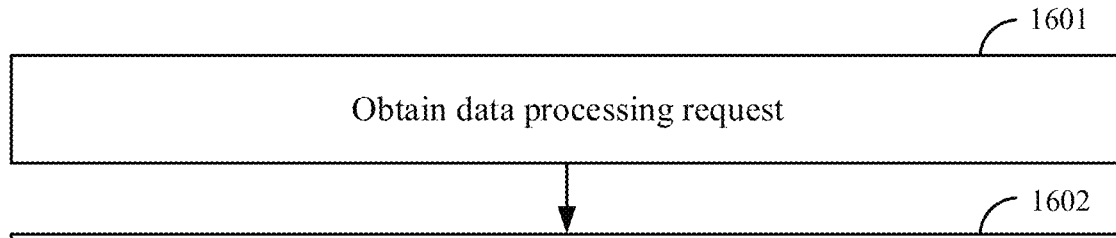

1601

Obtain data processing request

1602

Through Overlay network, send data processing request to target container, where target container is configured to implement data processing process based on data processing request, container is created on server according to drag-and-drop operation on to-be-deployed node in deployment interface, and container is configured to provide big data cluster services

FIG. 16

METHODS OF DEPLOYING BIG DATA CLUSTER AND BIG DATA CLUSTER BASED DATA PROCESSING METHODS

CROSS-REFERENCE TO RELATED APPLICATIONS

This application is a US national stage of international PCT Application No. PCT/CN2022/106091 filed on Jul. 15, 2022, the entire contents of which are incorporated herein by reference.

TECHNICAL FIELD

The present disclosure relates to the technical field of computer technology, in particular to methods of deploying a big data cluster and big data cluster based data processing methods.

BACKGROUND

With rapid development of computer technology and information technology, the scale of an industry application system is rapidly expanding, and data generated by an industry application increases exponentially. With industries or enterprises with data scale of hundreds of terabyte (TB), dozens of petabyte (PB) or even hundreds of PB arising, to effectively process big data, research on big data management and application methods emerges as the times require.

In related technologies, the deployment and operation of a big data cluster are mainly realized through a distributed computing platform (such as Hadoop), so as to realize high-speed data computing and storage through deployed services.

However, when deploying services of the big data cluster through the distributed computing platform, the relevant technical personnel need to manually download compression packages of components, install software development environments, modify relevant configuration files, etc. The operation is complex, and the requirements for the relevant technical personnel are high, resulting in high deployment costs and low deployment efficiency for a big data cluster.

SUMMARY

In the present disclosure, a method of deploying a big data cluster and big data cluster based data processing methods are provided to solve the deficiencies in related technologies.

According to the first aspect of the embodiments of the present disclosure, a method of deploying a big data cluster is provided, and includes:

displaying a deployment interface;

in response to a node creation operation in the deployment interface, displaying a to-be-deployed node in a temporary resource pool region in the deployment interface, where a node is a service included in a big data component to provide a data management function;

in response to a drag-and-drop operation on the to-be-deployed node in the temporary resource pool region, displaying the to-be-deployed node in a physical pool in a deployment resource pool region in the deployment interface; and in response to a start deployment operation in the deployment interface, according to the physical pool where the to-be-deployed node is located, creating a container corresponding to the to-be-deployed node on a server corresponding to the physical pool, where the container is configured to provide a big data cluster service.

In some embodiments, the deployment interface includes a node creation region, where the node creation region includes a create-node control and at least one big data component, and in response to the node creation operation in the deployment interface, displaying the to-be-deployed node in the temporary resource pool region in the deployment interface includes:

in a case that one of the at least one big data component is selected, in response to a triggering operation on the create-node control, displaying a to-be-deployed node corresponding to the selected big data component in the temporary resource pool region.

In some embodiments, the node creation region further includes a set-node-parameter control, the set-node-parameter control is configured to set a version of the to-be-deployed node; and in response to the triggering operation on the create-node control, displaying the to-be-deployed node corresponding to the selected big data component in the temporary resource pool region includes:

in response to the triggering operation on the create-node control, displaying the to-be-deployed node corresponding to a version set by the set-node-parameter control in the temporary resource pool region.

In some embodiments, the at least one big data component comprises an HDFS component, a YARN component, a Hive component and a Clickhouse component.

In some embodiments, the deployment resource pool region includes at least one physical pool; and in response to the drag-and-drop operation on the to-be-deployed node in the temporary resource pool region, displaying the to-be-deployed node in the physical pool in the deployment resource pool region in the deployment interface includes:

for any to-be-deployed node, in response to the drag-and-drop operation on the to-be-deployed node, displaying the to-be-deployed node in the physical pool indicated at an end of the drag-and-drop operation.

In some embodiments, in response to the start deployment operation in the deployment interface, according to the physical pool where the to-be-deployed node is located, deploying the container corresponding to the to-be-deployed node on the server corresponding to the physical pool includes:

in response to the start deployment operation, based on a component type of the big data component to which the to-be-deployed node belongs, determining a target plugin;

through the target plugin, starting a target interface on the server corresponding to the physical pool; and through the target interface, deploying the container corresponding to the to-be-deployed node on the server corresponding to the physical pool.

In some embodiments, through the target interface, deploying the container corresponding to the to-be-deployed node on the server corresponding to the physical pool includes:

through the target plugin, obtaining a target installation environment from a first configuration file by reading the first configuration file; and through the target interface, deploying the container corresponding to the to-be-deployed node on the server corresponding to the physical pool by modifying a configuration file of the target installation environment of the server.

In some embodiments, the target plugin comprises a binary package, the target plugin is stored at a set location in the big data cluster, and determining the target plugin includes:

obtaining the target plugin uploaded to an initial server of the big data cluster; and storing the target plugin at the set location in the big data cluster.

In some embodiments, in response to the start deployment operation in the deployment interface, according to the physical pool where the to-be-deployed node is located, deploying the container corresponding to the to-be-deployed node on the server corresponding to the physical pool includes:

based on the to-be-deployed node and the physical pool in which the to-be-deployed node is located, generating a first request message, where the first request message is configured to indicate a deployment of the container corresponding to the to-be-deployed node on the server corresponding to the physical pool;

based on the first request message and at least one deployed container on the server corresponding to the physical pool, determining a deployment operation type corresponding to the to-be-deployed node and a to-be-deleted container in the at least one deployed container, where the deployment operation type includes node adding, node moving, or node unchanging; and according to the deployment operation type corresponding to the to-be-deployed node and the to-be-deleted container in the at least one deployed container, performing a container deployment on the server corresponding to the physical pool.

In some embodiments, after in response to the start deployment operation, based on the to-be-deployed node and the physical pool in which the to-be-deployed node is located, generating the first request message, the method further includes:

storing the first request message in a first message queue; and obtaining the first request message from the first message queue; and based on the first request message and the at least one deployed container on the server corresponding to the physical pool, determining the deployment operation type corresponding to the to-be-deployed node and the to-be-deleted container in the at least one deployed container.

In some embodiments, according to the deployment operation type corresponding to the to-be-deployed node and the to-be-deleted container in the at least one deployed container, performing the container deployment on the server corresponding to the physical pool including:

in response to determining that the deployment operation type is node adding, calling a component plugin corresponding to a node type of the to-be-deployed node, and creating a container corresponding to the to-be-deployed node on the server corresponding to the physical pool;

in response to determining that the deployment operation type is node moving, deleting a deployed container corresponding to the to-be-deployed node from a server where the container corresponding to the to-be-deployed node is deployed, creating a container corresponding to the to-be-deployed node on the server corresponding to the physical pool, and copying data of the deleted container to the created container;

in response to determining that the deployment operation type is node unchanging, performing no operation on the server corresponding to the physical pool; and in response to determining that there is a to-be-deleted container in the at least one deployed container, deleting the to-be-deleted container from the server corresponding to the physical pool.

In some embodiments, after in response to the start deployment operation, based on the to-be-deployed node and the physical pool in which the to-be-deployed node is located, generating the first request message, the method further includes at least one of:

verifying a data format of the first request message; or according to a preset deployment rule, verifying deployment data carried by the first request message.

In some embodiments, the method further includes at least one of:

in response to the first request message, generating an operation record in a first deployment table, where the operation record is configured to record a current deployment operation; or in response to the first request message, generating a container deployment record corresponding to the to-be-deployed node in a second deployment table, where the container deployment record is configured to record a deployment operation corresponding to the to-be-deployed node.

In some embodiments, the method further includes at least one of:

recording a deployment status for a current operation in the operation record; or recording a deployment status for a container corresponding to the to-be-deployed node in the container deployment record;

where the deployment status includes an undeployed status, a deployed status or a deployment error status.

In some embodiments, there are multiple types of the to-be-deployed nodes, and the method further includes:

displaying a deployment instruction interface;

obtaining a component version and a type of a to-be-deployed big data component, and target data through the deployment instruction interface, where the target data is configured to indicate a number of data pieces stored per second required for data processing needs; and based on the type and the component version of the to-be-deployed big data component, the target data and a preset parameter, determining a recommended deployment number of each of the multiple types of the to-be-deployed nodes.

In some embodiments, the deployment resource pool region includes an add-new-physical-pool control, and the method further includes:

in response to a triggering operation on the add-new-physical-pool control, displaying an adding physical pool interface, wherein the adding physical pool interface comprises an obtain-identification control and a obtain-password control;

through the obtain-identification control, obtaining a server identification corresponding to a to-be-added physical pool, and through the obtain-password control, obtaining a to-be-verified password; and in response to determining that the to-be-verified password is verified, displaying the to-be-added physical pool in the deployment resource pool region.

In some embodiments, after through the obtain-identification control, obtaining the server identification corresponding to the to-be-added physical pool, and through the obtain-password control, obtaining the to-be-verified password, the method further includes:

in response to determining that the to-be-verified password is verified, generating a second request message;

storing the second request message in a second message queue; and obtaining the second request message from the second message queue, based on the second request message, send an installation file to a server corresponding to the to-be-added physical pool, where the server is configured to install the installation file upon receiving the installation file, to enable the server to be added to the big data cluster.

In some embodiments, the method further includes:

in response to determining that the to-be-verified password does not pass or the server is not successfully to be added to the big data cluster, displaying a first prompt message, where the first prompt message is configured to indicate a reason why the server is not successfully to be added to the big data cluster.

In some embodiments, the method further includes:

in response to determining that the to-be-verified password is verified, generating a server deployment record in a third deployment table, where the server deployment record is configured to record a deployment operation corresponding to the to-be-added physical pool.

In some embodiments, the method further includes:

recording an initialization status of the server corresponding to the to-be-added physical pool in the server deployment record, where the initialization status includes a to-be-initialized status, an initializing status, an initialization error status, or an initialization completed status.

In some embodiments, the method further includes:

in response to determining that the to-be-verified password is verified, sending a target key to the server corresponding to the to-be-added physical pool, where the target key is configured for identity verification in a communication process.

In some embodiments, the deployment resource pool region includes a delete-physical-pool control, one physical pool corresponds to one delete-physical-pool control, and the method further includes:

in response to a triggering operation on any delete-physical-pool control, no longer displaying a physical pool corresponding to the delete-physical-pool control in the deployment resource pool region.

In some embodiments, the method further includes:

in response to a triggering operation on any delete-physical-pool control, deleting a deployed container from a server corresponding to a physical pool corresponding to the delete-physical-pool control.

In some embodiments, the deployment resource pool region includes a set-top-physical-pool control, one physical pool corresponds to one set-top-physical-pool control, and the method further includes:

in response to a triggering operation on any set-top-physical-pool control, displaying a physical pool corresponding to the set-top-physical-pool control at a first target location in the deployment resource pool region.

In some embodiments, the method further includes:

for any physical pool displayed in the deployment resource pool region, displaying a server identification of the server corresponding to the physical pool at a second target location of the physical pool, and displaying current storage usage, memory usage, and allocated memory usage of the server corresponding to the physical pool at a third target location of the physical pool.

In some embodiments, the deployment interface further includes a restore-setting control, and the method further includes:

in response to a triggering operation on the restore-setting control, generating a third request message, where the third request message is configured to request deletion of a deployed server and a deployed container; and based on the third request message, deleting the deployed container from the deployed server, and executing a third preset script file to detach the deployed server from the big data cluster.

In some embodiments, the big data cluster includes at least one server, the at least one server includes an initial server, and the method includes:

installing a target runtime environment on the initial server, and configuring an interface corresponding to the target runtime environment on the initial server;

creating an Overlay network corresponding to the target runtime environment on the initial server, and initializing a cluster environment on the initial server;

creating a basic image of a big data component on the initial server, where the basic image of the big data component is configured to provide a foundation for constructing a container; and generating a target key file on the initial server.

In some embodiments, different containers of the big data cluster communicate through the Overlay network.

According to the second aspect of the embodiments of the present disclosure, a big data cluster based data processing method is provided, and includes:

obtaining a data processing request through a management plugin, where the management plugin is configured to indicate processing of data on a target server;

through an Overlay network, sending the data processing request to a target server, where the target server is configured to implement data processing based on the data processing request through a container included in the target server, where the container is created on the target server according to a drag-and-drop operation on a to-be-deployed node in a temporary resource pool region for node deployment and is configured to provide a big data cluster service.

In some embodiments, through the Overlay network, sending the data processing request to the target server includes:

based on the data processing request, determining at least one target container in the target server; and through the Overlay network, sending the data processing request to the at least one target container.

In some embodiments, in a case where a number of the at least one target container is greater than or equal to 2, the at least one target container includes a first target container and a second target container, and through the Overlay network, sending the data processing request to the at least one target container includes:

through the Overlay network, sending the data processing request to the first target container, wherein the first target container is configured to communicate with the second target container through the Overlay network to complete a response to the data processing request.

In some embodiments, the data processing request includes a data storing request, a data obtaining request, or a data deleting request.

According to the third aspect of the embodiments of the present disclosure, a system for a big data cluster deployment and corresponding data processing is provided, and includes:

a visualization operation module, configured to display a deployment interface, where the visualization operation module is further configured to, in response to a node creation operation in the deployment interface, display a to-be-deployed node in a temporary resource pool region in the deployment interface, where a node is a service included in a big data component to provide a data management function; and the visualization operation module is further configured to, in response to a drag-and-drop operation on the to-be-deployed node in the temporary resource pool region, display the to-be-deployed node in a physical pool in a deployment resource pool region in the deployment interface; and a service constructing module, configured to, in response to a start deployment operation in the deployment interface, according to the physical pool where the to-be-deployed node is located, create a container corresponding to the to-be-deployed node on a server corresponding to the physical pool, wherein the container is configured to provide a big data cluster service.

In some embodiments, the deployment interface includes a node creation region, where the node creation region includes a create-node control and at least one big data component;

The visualization operation module, when in response to the node creation operation in the deployment interface, displaying the to-be-deployed node in the temporary resource pool region in the deployment interface, is configured to:

when any big data component is selected, in response to the triggering operation on the create-node control, display a to-be-deployed node corresponding to the selected big data component in the temporary resource pool region.

In some embodiments, the node creation region further includes a set-node-parameter control. The set-node-parameter control is configured to set a version of the to-be-deployed node; and the visualization operation module, when in response to the triggering operation on the create-node control, displaying a to-be-deployed node corresponding to the selected big data component in the temporary resource pool region, is configured to:

in response to the triggering operation on the create-node control, display the to-be-deployed node corresponding to a version set by the set-node-parameter control in the temporary resource pool region.

In some embodiments, the big data components include an HDFS component, a YARN component, a Hive component, and a Clickhouse component.

In some embodiments, the deployment resource pool region includes at least one physical pool; and the visualization operation module, when in response to the drag-and-drop operation on the to-be-deployed node in the region of the temporary resource pool, displaying the to-be-deployed node in the physical pool in the region of the deployment resource pool in the deployment interface, is configured to:

for any to-be-deployed node, in response to the drag-and-drop operation on the to-be-deployed node, display the to-be-deployed node in the physical pool indicated at an end of the drag-and-drop operation.

In some embodiments, the service constructing module, when in response to the start deployment operation in the deployment interface, deploying the containers corresponding to the to-be-deployed nodes on the server corresponding to the physical pool in which the to-be-deployed nodes is located, is configured to:

in response to the start deployment operation, based on a component type of the big data component to which the to-be-deployed node belongs, determine a target plugin;

through the target plugin, start a target interface on the server corresponding to the physical pool; and through the target interface, deploy the container corresponding to the to-be-deployed node on the server corresponding to the physical pool.

In some embodiments, the service constructing module, when through the target interface, deploying a container corresponding to the to-be-deployed node on the server corresponding to the physical pool, is configured to:

through the target plugin, obtain a target installation environment from a first configuration file by reading the first configuration file; and through the target interface, modify a configuration file of the target installation environment of the server, to deploy the container corresponding to the to-be-deployed node on the server corresponding to the physical pool.

In some embodiments, the target plugin is a binary package, and the target plugin is stored at a set location in the big data cluster; and the process of determining the target plugin includes:

obtaining the target plugin uploaded to an initial server of the big data cluster; and storing the target plugin at the set location in the big data cluster.

In some embodiments, the service constructing module, when in response to the start deployment operation in the deployment interface, deploying the containers corresponding to the to-be-deployed nodes on the server corresponding to the physical pool in which the to-be-deployed nodes is located, is configured to:

in response to the start deployment operation, based on the to-be-deployed node and the physical pool in which the to-be-deployed node is located, generate a first request message, where the first request message is configured to indicate a deployment of the container corresponding to the to-be-deployed node on the server corresponding to the physical pool;

based on the first request message and at least one deployed container on the server corresponding to the physical pool, determine a deployment operation type corresponding to the to-be-deployed node and a to-be-deleted container in the at least one deployed container, where the deployment operation type includes node adding, node moving, or node unchanging; and according to the deployment operation type corresponding to the to-be-deployed node and the to-be-deleted container in the at least one deployed container, perform a container deployment on the server corresponding to the physical pool.

In some embodiments, the service constructing module is further configured to store the first request message in the first message queue.

the system further includes:

a message module, configured to obtain the first request message from the first message queue; and the service constructing module is further configured to, in response to determining that the message module obtains the first request message, based on the first request message and the at least one deployed container on the server corresponding to the physical pool, determine a deployment operation type corresponding to the to-be-deployed node and the to-be-deleted container in the at least one deployed container.

In some embodiments, the service constructing module, when according to the deployment operation type corresponding to the to-be-deployed node and the to-be-deleted container in the deployed containers, deploying a container on the server corresponding to the physical pool, is configured to:

in response to determining that the deployment operation type is node adding, call the component plugin corresponding to the node type of the to-be-deployed node, and create a container corresponding to the to-be-deployed node on the server corresponding to the physical pool;

in a case where the deployment operation type is node moving, delete the deployed container corresponding to the to-be-deployed node from the server where the container corresponding to the to-be-deployed node is already deployed, and create the container corresponding to the to-be-deployed node in the server corresponding to the physical pool, and copy the data in the deployed container to the created container;

in response to determining that the deployment operation type is node unchanging, perform no operation on the server corresponding to the physical pool; and in response to determining that there is a to-be-deleted container in the deployed containers, delete the to-be-deleted container from the server corresponding to the physical pool.

In some embodiments, the service constructing module is further configured to verify the data format of the first request message; and the service constructing module is further configured to, according to a preset deployment rule, verify deployment data carried by the first request message.

In some embodiments, the system further includes a database module, where the database module is configured to, in response to the first request message, generate an operation record in a first deployment table, where the operation record is configured to record a current deployment operation; and the database module is further configured to in response to the first request message, generate a container deployment record corresponding to the to-be-deployed node in a second deployment table, where the container deployment record is configured to record a deployment operation corresponding to the to-be-deployed node.

In some embodiments, the database module is further configured to record the deployment status of the current operation in the operation record; and the database module is further configured to record the deployment status of the container corresponding to the to-be-deployed node in the container deployment record;

where the deployment status includes an undeployed status, a deployed status or a deployment error status;

In some embodiments, there are multiple types of the to-be-deployed nodes;

the visualization operation module is further configured to display the deployment instruction interface;

the visualization operation module is further configured to obtain target data filled in by users through the deployment instruction interface, where the target data is configured to indicate the number of data pieces stored per second by the to-be-deployed container; and the service constructing module is further configured to, based on the target data and the preset parameter, determine the recommended deployment number of each type of to-be-deployed node.

In some embodiments, the deployment resource pool region includes an add-new-physical-pool control, and the visualization operation module is further configured to:

in response to the triggering operation on the add-new-physical-pool control, display an interface for adding a physical pool, where the interface for adding a physical pool includes the obtain-identification control and obtain-password control;

through the obtain-identification control, obtain the server ID corresponding to the to-be-added physical pool, and through the obtain-password control, obtain the to-be-verified password; and in response to determining that the to-be-verified password is verified, display the to-be-added physical pool in the deployment resource pool region.

In some embodiments, the service constructing module is further configured to generate a second request message when the to-be-verified password has passed;

the service constructing module is further configured to store the second request message in the second message queue;

the system further includes:

a message module, configured to obtain the second request message from the second message queue; and the service constructing module is further configured to, based on the second request message, send an installation file to the server corresponding to the to-be-added physical pool. The server is configured to install the installation file upon receiving the installation file, such that the server can join the big data cluster.

In some embodiments, the visualization operation module is further configured to, in response to determining that the to-be-verified password does not pass or the server is not successfully to be added to the big data cluster, display a first prompt message, where the first prompt message is configured to indicate a reason why the server is not successfully to be added to the big data cluster.

In some embodiments, the system further includes:

a database module, configured to, in response to determining that the to-be-verified password is verified, generate a server deployment record in a third deployment table, where the server deployment record is configured to record a deployment operation corresponding to the to-be-added physical pool.

In some embodiments, the database module is further configured to record an initialization status of the server corresponding to the to-be-added physical pool in the server deployment record. The initialization status can include a to-be-initialized status, an initializing status, an initialization error status, and an initialization completed status.

In some embodiments, the deployment resource pool region includes a delete-physical-pool control, one physical pool corresponds to one delete-physical-pool control, and the visualization operation module is further configured to, in response to a triggering operation on any delete-physical-pool control, no longer display the physical pool corresponding to the delete-physical-pool control in the deployment resource pool region.

In some embodiments, the service constructing module is further configured to, in response to a triggering operation on any delete-physical-pool control, delete the deployed container from the server corresponding to the physical pool corresponding to the delete-physical-pool control.

In some embodiments, the deployment resource pool region includes a set-top-physical-pool control, one physical pool corresponds to one set-top-physical-pool control, and the visualization operation module is further configured to, in response to a triggering operation on any set-top-physical-pool control, display the physical pool corresponding to the set-top-physical-pool control at a first target location in the deployment resource pool region.

In some embodiments, the visualization operation module is further configured to, for any physical pool displayed in the deployment resource pool region, display identification of the server corresponding to the physical pool at a second target location of the physical pool, and display current storage usage, memory usage, and allocated memory usage of the server corresponding to the physical pool at a third target location of the physical pool.

In some embodiments, the deployment interface further includes a restore-setting control, and the service constructing module is further configured to, in response to a triggering operation on a restore-setting control, generate a third request message. The third request message is configured to request the deletion of deployed servers and containers;

the service constructing module is further configured to, based on the third request message, delete multiple deployed containers from deployed servers and execute a third preset script file to detach the deployed servers from the big data cluster.

In some embodiments, the big data cluster includes at least one server, the at least one server includes an initial server, and the service constructing module is further configured to:

install a target runtime environment on the initial server, and configure an interface corresponding to the target runtime environment on the initial server;

create an Overlay network corresponding to the target runtime environment on the initial server, and initialize a cluster environment on the initial server;

create a basic image of a big data component on the initial server, where the basic image of the big data component is configured to provide a foundation for constructing a container; and generate a target key file on the initial server.

In some embodiments, the system further includes a network module to ensure cross-server communication between containers.

In some embodiment, the network module is configured to, after obtaining a data processing request, through the Overlay network, send the data processing request to a target container, where the target container is configured to implement data processing based on the data processing request, and a container is created on a server according to a drag-and-drop operation on a to-be-deployed node in a deployment interface and is configured to provide a big data cluster service.

In some embodiments, the network module, when through the Overlay network, sending the data processing request to a target container, is configured to:

based on the data processing request, determine at least one target container; and through the Overlay network, send the data processing request to the at least one target container.

In some embodiments, in a case where the number of the at least one target container is greater than or equal to 2, the at least one target container includes a first target container and a second target container, and the network module, when through the Overlay network, sending the data processing request to the at least one target container, is configured to:

through the Overlay network, send the data processing request to the first target container, where the first target container is configured to communicate with the second target container through the Overlay network to complete a response to the data processing request.

In some embodiments, the data processing request includes a data storing request, a data obtaining request, or a data deleting request.

In some embodiments, the system further includes a big data component plugin module, where the big data component plugin module is configured to start a container on the server.

According to the fourth aspect of the embodiments of the present disclosure, a computing device is provided. The computing device includes a memory, a processor and a computer program stored on the memory and runnable on the processor, where the processor, when executing the program, implements operations in the method of deploying a big data cluster according to the embodiments in the first aspect and any one of the embodiments in the first aspect, or, operations in the big data cluster based data processing method according to the embodiments in the second aspect and any one of the embodiments in the second aspect.

According to the fifth aspect of the embodiments of the present disclosure, a computer-readable storage medium is provided, where the storage medium stores a program, and the program when executed by a processor implements operations in the method of deploying a big data cluster according to the embodiments in the first aspect and any one of the embodiments in the first aspect, or, operations in the big data cluster based data processing method according to the embodiments in the second aspect and any one of the embodiments in the second aspect.

According to the sixth aspect of the embodiments of the present disclosure, a computer program product is provided, which includes a computer program, where the computer program when executed by a processor implements operations in the method of deploying a big data cluster according to the embodiments in the first aspect and any one of the embodiments in the first aspect, or, operations in the big data cluster based data processing method according to the embodiments in the second aspect and any one of the embodiments in the second aspect.

In the present disclosure, a deployment interface is provided, to provide a method of deploying a big data cluster through the deployment interface. The method includes: in response to a node creation operation in the deployment interface, displaying a to-be-deployed node in a temporary resource pool region in the deployment interface; in response to a drag-and-drop operation on the to-be-deployed node in the temporary resource pool region, displaying the to-be-deployed node in a physical pool in the deployment resource pool region in the deployment interface; and in response to a start deployment operation in the deployment interface, according to the physical pool where the to-be-deployed node is located, creating a container corresponding to the to-be-deployed node on a server corresponding to the physical pool, where the container is configured to provide a big data cluster service. The above deployment process can greatly simplify the operations of the relevant technical personnel, thereby reducing the deployment cost of big data clusters and improving deployment efficiency.

In addition, in the present disclosure, through the Overlay network, communication between various containers in the big data cluster is ensured, such that when a data processing request is obtained, the data processing request can be sent to the target container through the Overlay network, such that the target container can implement the data processing process based on the data processing request to meet the data processing needs of users.

It is to be understood that the above general descriptions and the below detailed descriptions are merely exemplary and explanatory, and are not intended to limit the present disclosure.

BRIEF DESCRIPTION OF DRAWINGS

The accompanying drawings herein, which are incorporated in and constitute a part of the present description, illustrate examples consistent with the present disclosure and serve to explain the principles of the present disclosure together with the description.

FIG. 1 illustrates a method of deploying a big data cluster according to an embodiment of the present disclosure.

FIG. 15 is a schematic diagram of a construction process of a Redis cluster according to an embodiment of the present disclosure.

FIG. 16 is a flowchart of a big data cluster based data processing method according to an embodiment of the present disclosure.

DETAILED DESCRIPTION

Figure 2:
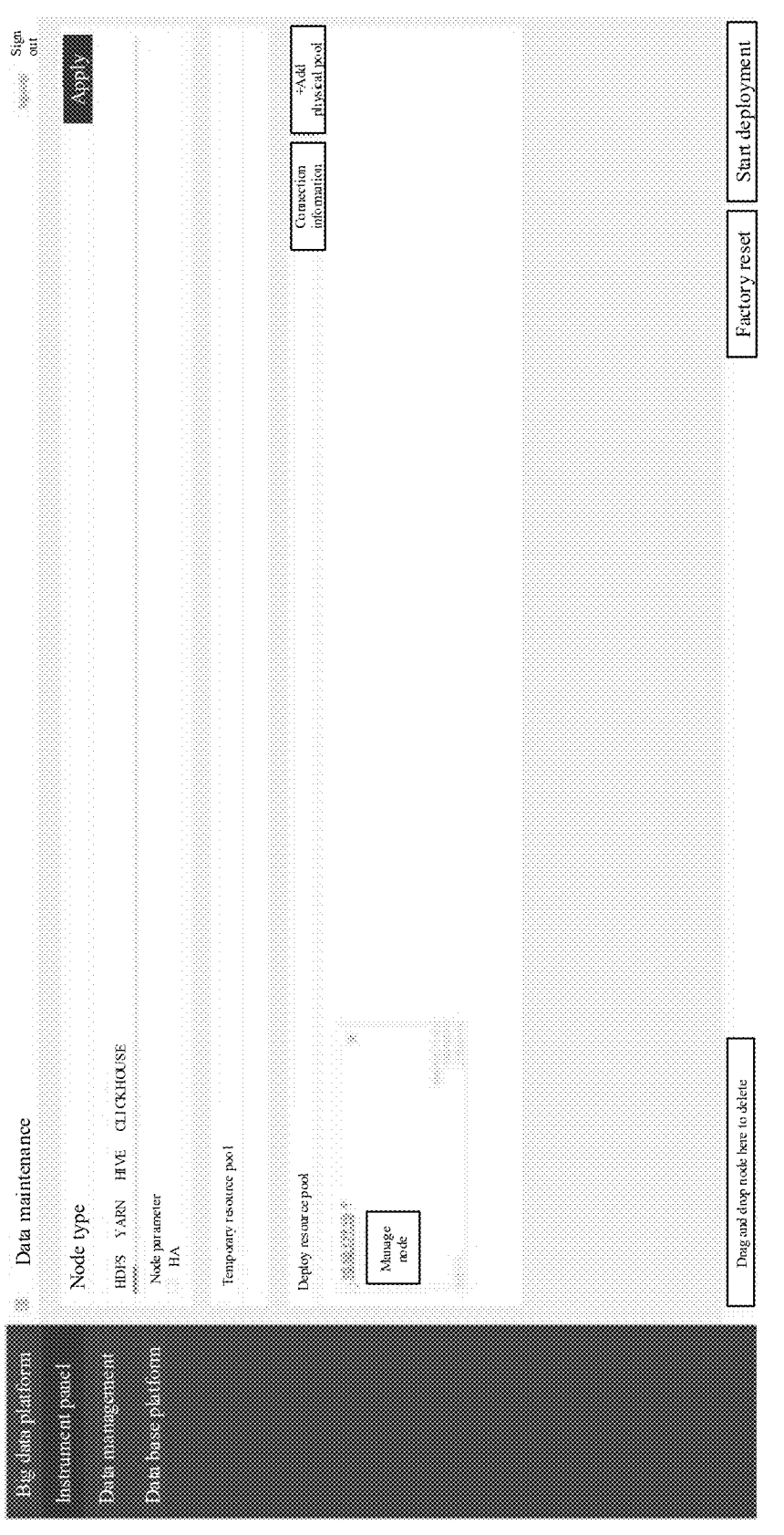
FIG. 2 is a schematic diagram of a deployment interface according to an embodiment of the present disclosure.

Exemplary embodiments will be described in detail herein, examples of which are illustrated in the accompanying drawings. Where the following description refers to the drawings, elements with the same numerals in different drawings refer to the same or similar elements unless otherwise indicated. Implementations described in the following embodiments do not represent all implementations consistent with the present disclosure. On the contrary, they are examples of an apparatus and a method consistent with some aspects of the present disclosure described in detail in the appended claims.

In the present disclosure, a method of deploying a big data cluster and a big data cluster based data processing method are provided. For the problems that the current big data platform occupies a large number of machines and the threshold for deployment and use is high, the big data platform is lightweight transformed to achieve containerized deployment of components and reduce the number of machines required by the big data platform. Moreover, in the method provided in the present disclosure, a visualized operation interface is provided, that is, a deployment interface, such that the relevant technical personnel can deploy a big data cluster through simple drag-and-drop operations, so as to reduce the technical threshold of big data cluster deployment, enable the relevant technical personnel to quickly complete the implementation of cluster deployment, expansion, shrinking, reset and other functions, improve deployment efficiency, and reduce deployment costs, such that the ordinary technical personnel can complete deployment.

The method provided in the present disclosure can be applied to computing devices, which can be servers, such as one server, multiple servers, a server cluster, etc. The present disclosure does not limit the type and number of computing devices.

After introducing the implementation environment of the present disclosure, the method of deploying a big data cluster and the data processing method based on the big data cluster provided in the present disclosure are introduced respectively below.

Referring to FIG. 1, illustrating a method of deploying a big data cluster according to an embodiment of the present disclosure, the method includes following steps 101 to 104. In step 101, a deployment interface is displayed.

In step 102, in response to a node creation operation in the deployment interface, a to-be-deployed node is displayed in a region of a temporary resource pool in the deployment interface. The node is a service included in the big data component to provide a data management function.

The temporary resource pool is equivalent to a virtual pool. The temporary resource pool is set for the convenience of the drag-and-drop operations by users, and a node stored in the temporary resource pool is not actually the to-be-deployed node. By displaying the to-be-deployed node generated based on the node creation operation in an interface region corresponding to the temporary resource pool (i.e., the region of the temporary resource pool), the node can be dragged and dropped to an interface region corresponding to the deployment resource pool (i.e., the region of the temporary resource pool), such that nodes can be deployed based on the deployment manners of the nodes in the deployment resource pool.

In step 103, in response to the drag-and-drop operation on the to-be-deployed node in the region of the temporary resource pool, the to-be-deployed node is displayed in the physical pool in the region of the deployment resource pool in the deployment interface.

The node displayed in the deployment resource pool is actually the to-be-deployed node. The deployment resource pool includes at least one physical pool. Each physical pool is an actual machine. Through the deployment resource pool, resources from different machines can be integrated and used. The relevant technical personnel can deploy containers according to actual needs.

In step 104, in response to a start deployment operation in the deployment interface, according to the physical pool where the to-be-deployed node is located, a container corresponding to the to-be-deployed node is created on the server corresponding to the physical pool. The container is configured to provide a big data cluster service.

In the present disclosure, a deployment interface is provided, to provide a big data cluster deployment function through the deployment interface. After the relevant technical personnel drag and drop nodes and trigger components on the deployment interface, the background can respond to corresponding operations on the deployment interface to automatically complete the deployment of containers, such that big data cluster services can be provided through the containers. The above deployment process can greatly simplify the operations of the relevant technical personnel, thereby reducing the deployment cost of big data clusters and improving deployment efficiency.

After the basic implementation process of the method of deploying a big data cluster provided in the present disclosure is introduced, various embodiments of the present disclosure are introduced below.

In some embodiments, to ensure the smooth progress of the method in the present disclosure, some preparatory work can be carried out in advance. In some embodiments, at least one server can be prepared in advance for deploying a big data cluster and ensuring smooth communication between servers. For example, n servers can be prepared in advance, and n can be a positive integer greater than or equal to 1. For ease of explanation, these n servers can be marked as S1, S2, . . . , Sn.

In some embodiments, one of the at least one server can be selected as an initial server, such that the required network environment can be deployed on the initial server in advance, so as to realize the construction of the big data cluster through the deployed network environment.

In some embodiments, the process of deploying the required network environment on the initial server in advance can include the following steps.

In step 1, a target runtime environment is installed on the initial server, and an interface corresponding to the target runtime environment is configured on the initial server.

The target runtime environment can include the Docker environment, and the interface corresponding to the target runtime environment can be the Docker Application Programming Interface (API).

For example, server S1 can be configured as the initial server to install the Docker environment on server S1, and the Docker API can be configured on server S1 to support subsequent operations on Docker engines on other servers (for example, to support RESTful operations on Docker engines).

In step 2, an Overlay network corresponding to the target runtime environment is created on the initial server, and a cluster environment is initialized on the initial server.

The Overlay network is a logical network that uses network virtualization to establish connections on top of physical infrastructure. Compared to the concept of the Overlay network, the big data cluster further include an UnderLay network. The Underlay network is a physical network responsible for transmitting data packets, composed of devices such as switches and routers, and driven by Ethernet protocols, routing protocols, and VLAN protocols. Compared to the UnderLay network, the Overlay network achieves the separation of control plane and forwarding plane to meet the cross host communication requirements of containers.

Through the OverLay technology, one or more logical networks can be created on existing physical networks through the tunnel technology without any modifications to the physical networks, effectively solving many problems in a physical data center and achieving automation and intelligence of the data center.

For example, an Overlay network for the Docker environment can be created on server S1 as the initial server, and the Docker Swarm cluster environment can be initialized on the initial server.

By creating an Overlay network corresponding to the target runtime environment on the initial server, communication between the components included in the big data cluster can be achieved through the Overlay network to meet the communication needs within the big data cluster. By initializing the cluster environment on the initial server, the foundation for constructing a big data cluster can be provided, such that the construction of a big data cluster can be achieved based on the initial server subsequently.

In step 3, a basic image of the big data component is created on the initial server. The basic image of the big data component is configured to provide the foundation for constructing the container.

For example, a basic Docker image of the big data component can be created on the initial server to provide the startup function of the big data cluster service container through the basic Docker image of the big data component.

It should be noted that to facilitate subsequent containerization deployment, the environment and software required for various big data components can be packaged into Docker Image Tape Archive (Tar) packages, and the packaged Docker Image Tar packages can be uploaded to the initial server in advance, such that the initial server can install the Docker Image Tar package to achieve the creation of basic images of big data components.

The big data components can include multiple types of components, for example, the big data components can include a Hadoop Distributed File System (HDFS) component, a Yet Another Resource Negotiator (YARN) component, a distributed application coordination service (Zookeeper) component, a database tool (Clickhouse) component, a data warehouse tool (Hive) component, a security management (Knox) component, a monitoring tool (such as Prometheus and Grafana) component, etc. In addition, the big data components can further include other types of components, which is not limited in the present disclosure.

In some embodiments, environments and software required for different types of big data components can be packaged into one Docker Image Tar package, or environments and software required for different types of big data components can be packaged into different Docker Image Tar packages. For example, the HDFS component, the YARN component, and the Zookeeper component are packaged into one Docker Image Tar package, and the Clickhouse component, the Hive component, the Knox component and the monitoring tool component are respectively packaged into Docker Image Tar packages, which is not limited in the present disclosure.

Correspondingly, since different types of big data components can be packaged together into one Docker Image Tar package, and can also be separately packaged into multiple Docker Image Tar packages, when creating a basic image of a big data component on the initial server, the Docker Image Tar package that includes the environments and software required for multiple types of big data components can be installed to create a complete basic image of big data components, to meet the startup requirements of various types of service containers. Or multiple Docker Image Tar packages can be separately installed to obtain multiple basic images of big data components, to meet the startup requirements of corresponding types of service containers through each basic image of big data components.

It should be noted that in addition to the big data components mentioned above, developers can, according to needs, further develop Docker Image Tar packages corresponding to other big data components and add supported components through hot expansion by uploading and installing Docker Image Tar packages on the initial server.

In step 4, a target key file is generated on the initial server.

In some embodiments, symmetric or asymmetric encryption algorithms can be used to achieve key generation, and other algorithms can also be used to achieve key generation, which is not limited in the present disclosure.

The target key can be a Secure Shell (SSH) public and private key.

By generating a target key file, when new servers or containers are added to the big data cluster, the target key file can be shared with the added servers or containers, enabling secret-free communication between servers or between servers and containers in the big data cluster through target keys.

Through the above process, the construction of the basic network environment required for building a big data cluster can be completed, such that based on the established basic network environment, other servers can be added to the big data cluster to build a big data cluster including multiple servers. Moreover, based on the established basic network environment, containers can be deployed in the big data cluster to provide services to users through the deployed containers.

It should be noted that the above process only introduces the processing of the initial server of the big data cluster. In other embodiments, the relevant technical personnel can also add servers to the big data cluster according to actual needs to build a big data cluster that includes multiple servers.

In some embodiments, an add-new-physical-pool control can be set in the deployment interface, so that a server can be added to the big data cluster through the add-newphysical-pool control. For example, the add-new-physical-pool control can be set in the deployment resource pool region. Referring to FIG. 2, a schematic diagram of a deployment interface according to an embodiment of the present disclosure, the deployment interface is divided into a node creation region, a region of the temporary resource pool, and a region of the deployment resource pool. The "Add Physical Pool" button set in the deployment resource pool region is the add-new-physical-pool control. By clicking the "Add Physical Pool" button, the server can be added to the big data cluster.

By setting the add-new-physical-pool control in the deployment interface, users can add servers to the big data cluster based on actual technical needs, such that the created big data cluster can meet technical requirements and ensure the smooth progress of subsequent data processing processes.

In some embodiments, adding a physical pool to add a server to the big data cluster can be achieved through the following steps.

In step 1, in response to the triggering operation on the add-new-physical-pool control, an interface for adding a physical pool is displayed. The interface for adding a physical pool includes the obtain-identification control and obtain-password control.

Figure 3:
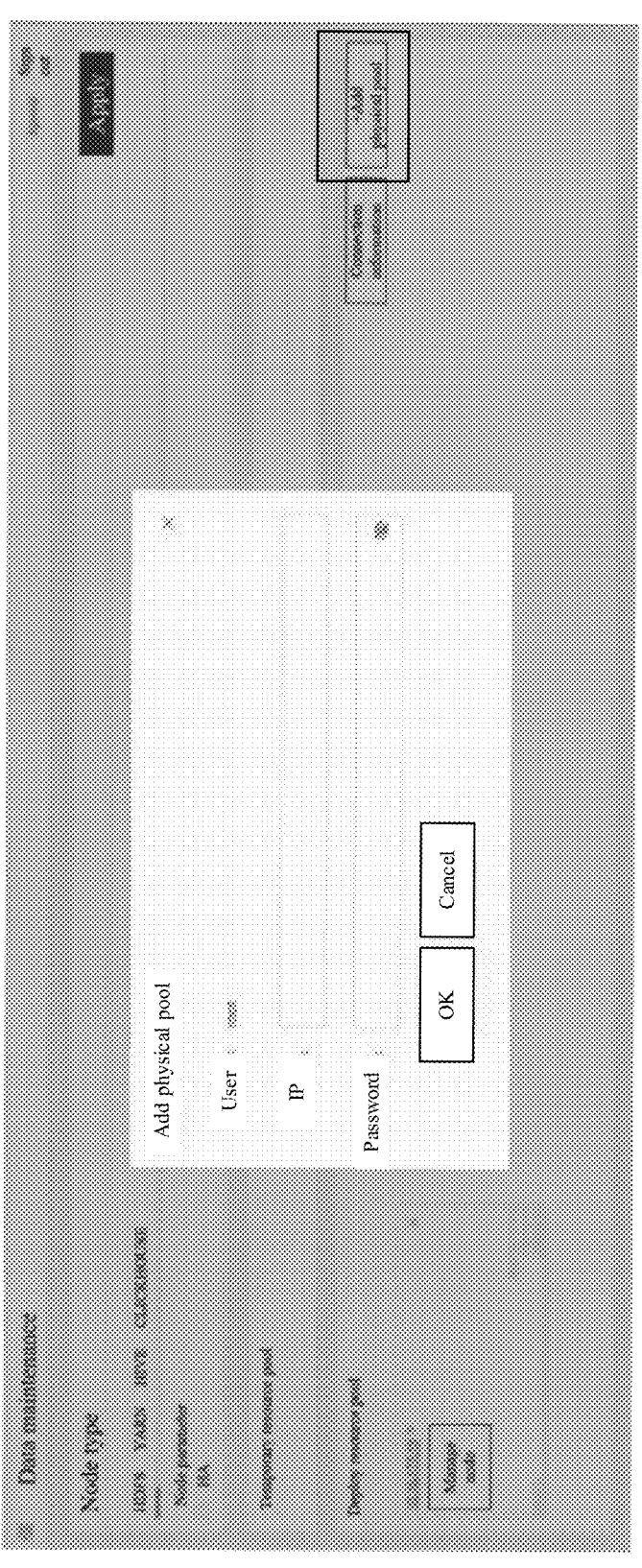
FIG. 3 is a schematic diagram of an interface for adding a physical pool according to an embodiment of the present disclosure.

Referring to FIG. 3, a schematic diagram of an interface for adding a physical pool according to an embodiment of the present disclosure, after the add-new-physical-pool control is triggered, the interface for adding a physical pool as shown in FIG. 3 can be displayed on a visualized interface, where an input box with a text prompt of "IP" is the obtain-identification control, and an input box with a text prompt of "password" is the obtain-password control.

In step 2, through the obtain-identification control, the server ID corresponding to the to-be-added physical pool is obtained, and through the obtain-password control, the to-be-verified password is obtained.

In some embodiments, the relevant technical personnel can enter the ID of the server to be added to the big data cluster in the obtain-identification control, and enter a preset password in the obtain-password control, such that the computing device can obtain the server ID corresponding to the to-be-added physical pool through the obtain-identification control, and obtain the to-be-verified password through the obtain-password control.

In some embodiments, after the server ID corresponding to the to-be-added physical pool is obtained through the obtain-identification control, and the to-be-verified password is obtained through the obtain-password control, the to-be-verified password can be verified.

In step 3, if the to-be-verified password is verified, the to-be-added physical pool is displayed in the deployment resource pool region.

By setting the obtain-identification control, a user can enter the ID of the server to be added to the big data cluster in the obtain-identification control to meet customization needs. By setting the obtain-password control, a user can enter the to-be-verified password in the password acquisition interface to verify the identity of the user based on the to-be-verified password. Thus, it can be determined whether the user has the authority to participate in the process of adding servers to the big data cluster, to ensure the security of the deployment process of the big data cluster.

In some embodiments, adding a physical pool can be achieved through the following steps.

If the to-be-verified password is verified, a second request message is generated, the second request message is stored in a second message queue, and then the second request message can be obtained from the second message queue subsequently. Based on the second request message, an installation file is sent to the server corresponding to the to-be-added physical pool, such that the server can install the installation file upon receiving the installation file, and the server can be added to the big data cluster.

The second request message can be request message data in Java Script Object Notation (JSON) format. In some embodiments, the second request message can further be other types of message data, which is not limited in the present disclosure.

Taking the second request message being request message data in JSON format as an example, the second request message can be in the following form of code:

```
{
ip": "10.10.177.18",
"password": "root"
}
```

The above is only an exemplary second request message and does not constitute a limitation on the second request message.

By generating a second request message, the computing device can implement the corresponding processing process based on the second request message.

The installation file can include Docker Image Tar packages and Red-Hat Package Manager (RPM) installation packages corresponding to various components, such that the computing device can install preset scripts (including first and second preset scripts) by installing RPM packages upon receiving the installation file. The first preset script is configured to implement a function of environmental installation. The second preset script is configured to implement a function of adding to the cluster. Therefore, the computing device can install Docker Image Tar packages through the first preset script to achieve environmental installation on the server to be added to the cluster, and then execute the second preset script on the server to be added to the cluster, such that the server can be added to the Docker Swarm cluster of the initial server.

In some embodiments, the computing device can be associated with a database that can be configured to store deployment records in a big data cluster. For example, the database can include a third deployment table, which can be configured to record operations of adding physical pools.

In some embodiments, if the to-be-verified password is verified, a server deployment record can be generated in the third deployment table. The server deployment record is configured to record the deployment operation corresponding to the to-be-added physical pool.

An initialization status of the server corresponding to the to-be-added physical pool can be recorded in the server deployment record. The initialization status can include a to-be-initialized status, an initializing status, an initialization error status, and an initialization completed status, such that the computing device can display the to-be-added physical pool in the deployment resource pool region based on the initialization status recorded in the server deployment record.

In some embodiments, the to-be-added physical pool can be displayed in different colors based on the initialization statuses recorded in the server deployment record. For example, when the initialization status recorded in the server deployment record is a to-be-initialized status or an initializing status, the to-be-added physical pool can be displayed in blue; when the initialization status recorded in the server deployment record is an initialization completed status, the to-be-added physical pool can be displayed in white; and when the initialization status recorded in the server deployment record is an initialization error status, the to-be-added physical pool can be displayed in red, such that the relevant technical personnel can visually observe the initialization status of the server.

For example, if the key to be verified has just passed verification and even if file installation has not yet started on the corresponding server, the deployment resource pool already shows the to-be-added physical pool. In this case, the initialization status of the server corresponding to the to-be-added physical pool is recorded as a to-be-initialized status in the server deployment record, and accordingly, the to-be-added physical pool is displayed in the deployment resource pool region in blue. In a case where file installation has already started on the server, the initialization status of the server corresponding to the to-be-added physical pool is recorded as an initializing status in the server deployment record. In this case, the to-be-added physical pool is displayed in the deployment resource pool region still in blue. In a case where the server is successfully added to the big data cluster, the initialization status of the server corresponding to the to-be-added physical pool is recorded as an initialization completed status in the server deployment record. Correspondingly, the to-be-added physical pool is displayed in the deployment resource pool region in white. In addition, if there is any error during the initialization process that prevent the server from successfully being added to the big data cluster, the initialization status of the server corresponding to the to-be-added physical pool is recorded as an initialization error status in the server deployment record. Correspondingly, the to-be-added physical pool is displayed in the deployment resource pool region in red.

It should be noted that the computing device can query the initialization status of a server every preset period, to update the display manner of the to-be-added physical pool based on the queried initialization status. The preset period can be 10 seconds, and in some embodiments, the preset period can further be other periods. The present disclosure does not limit the value of the preset period.

In some embodiments, a failure reason for the server failing to join to the big data cluster can also be recorded in the server deployment record, such that the relevant technical personnel can troubleshoot the problem. The failure reason can be an IP address error, a password error, or failure to connect to the server corresponding to the to-be-added physical pool, etc. In addition, time for requesting triggering, the ID of the server corresponding to the to-be-added physical pool, and time when the server corresponding to the to-be-added physical pool is successfully added to the big data cluster can further be recorded in the server deployment record. The present disclosure does not limit the content included in the server deployment record.

By maintaining the third deployment table in the database, changes to the big data cluster at server level can be recorded in the third deployment table, such that required operation records can be queried from the third deployment table subsequently to more comprehensively meet user needs.

It should be noted that after the initialization for a server is completed, the server and existing servers in the big data cluster can form a Docker Swarm cluster. In addition, in a case of an initialization error for a server, the server is unable to successfully join the big data cluster. In this case, the initialization status of the server recorded in the server deployment record is an initialization error status, and the failure reason is further recorded in the server deployment record. When the computing device determines that the initialization state is an initialization error status, the computing device can obtain the failure reason recorded in the server deployment record. Then, first prompt information can be displayed based on the obtained failure reason, such that the reason why the server did not successfully join the big data cluster can be indicated through the first prompt information, which is convenient for the relevant technical personnel to deal with it in time.

The above process is illustrated by using the example of verifying the to-be-verified password after the second request message is generated and based on the second request message. In some embodiments, after the second request message is generated, the second request message can be stored in the second message queue, such that the second request message can be obtained from the second message queue subsequently to perform the process of verifying the to-be-verified password based on the second request message.

By using a message queue to store a request message, synchronous processing for a user request on the display side and asynchronous processing on the background can be achieved, ensuring that users can continue to operate through the deployment interface without affecting the processing process on the background when the current request message is not really processed, so as to ensure that subsequent user requests can be timely responded to.

In addition, storing request messages through a message queue can ensure that in a case where a problem occurs in processing a request message, the request message that has not been successfully processed can be retrieved from the message queue for retry, without the need for users to manually operate on the interface again, simplifying user operations and improving user experience.

In addition, in some embodiments, if the to-be-verified password is verified, a target key can be sent to the server corresponding to the to-be-added physical pool, such that the target key can be used for identity verification in subsequent communication process, to ensure the security of the communication process without the need for login.

It should be noted that the above process is described using the process of adding a server to a big data cluster as an example. By repeating the above process, multiple servers can be added to the big data cluster. The specific process can be seen in the above embodiments, and is not repeated here.

Figure 4:
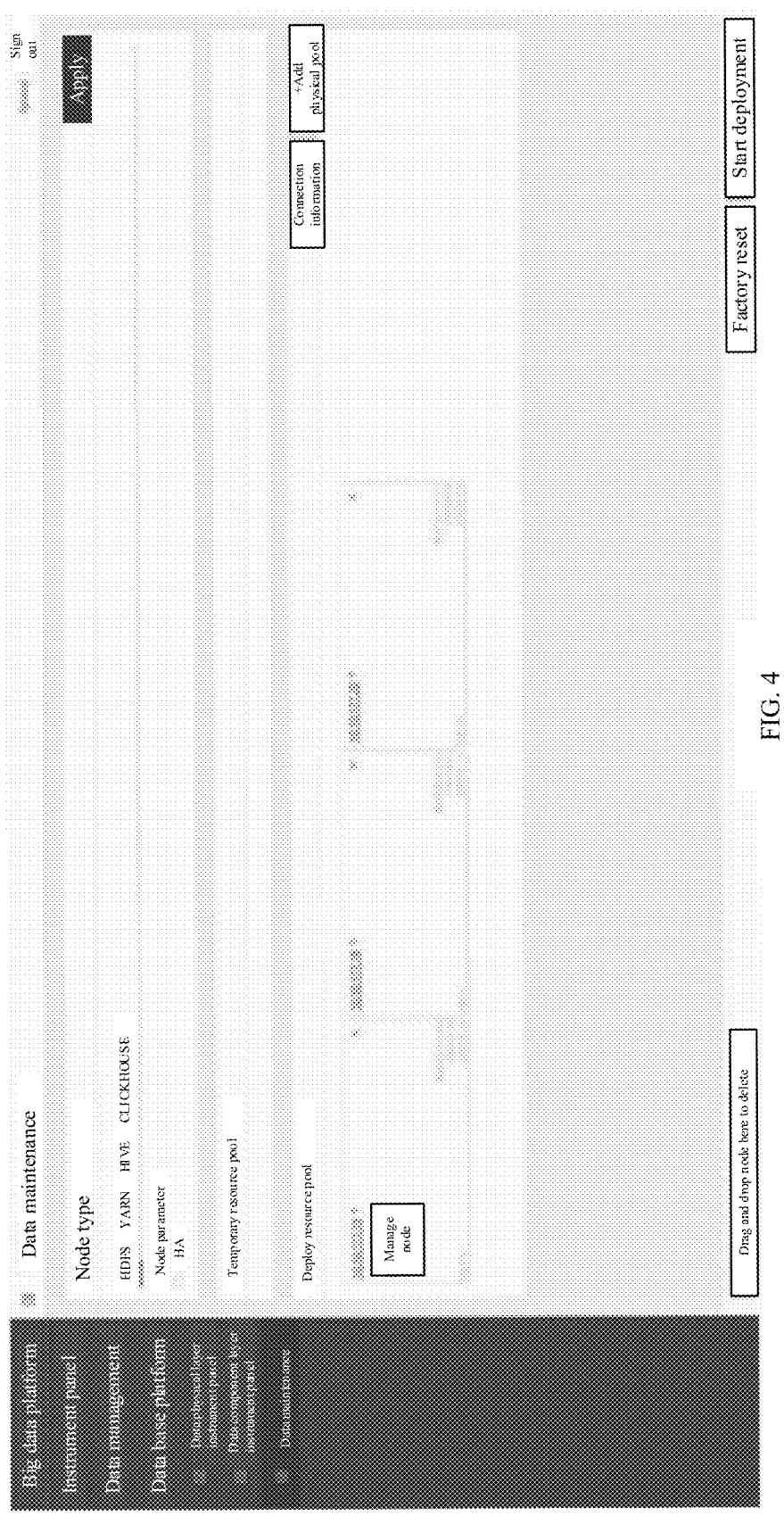
FIG. 4 is a schematic diagram of a deployment interface according to an embodiment of the present disclosure.

Referring to FIG. 4, a schematic diagram of a deployment interface according to an embodiment of the present disclosure, compared to the deployment interface shown in FIG. 2, two servers have been added to the big data cluster on the basis of the initial server (server ID 10.10.177.19), respectively with server IDs 10.10.177.18 and 10.10.177.20.

In some embodiments, when displaying the physical pool in the deployment resource pool region, relevant information about the physical pool can further be displayed, such as the ID of the server corresponding to the physical pool, current storage usage, memory usage, and allocated memory usage.

For example, for any physical pool displayed in the deployment resource pool region, the ID of the server corresponding to the physical pool can be displayed at a second target location of the physical pool, and the current storage usage, memory usage, and allocated memory usage of the server corresponding to the physical pool can be displayed at a third target location of the physical pool.

The second target position can be an upper left corner of the displayed physical pool, and the third target position can be a lower right corner of the displayed physical pool. Taking the deployment interface shown in FIG. 4 as an example, the deployment interface shown in FIG. 4 displays the ID of a corresponding server in the upper left corner of each physical pool, and displays the current storage usage, memory usage, and allocated memory usage of the corresponding server in the lower right corner of each physical pool. In some embodiments, the second and third target positions can also be other positions, which are not limited in the present disclosure.

By displaying the relevant status information of the corresponding server in the physical pool, users can intuitively observe status data of the server corresponding to each physical pool, such as current storage usage, memory usage, and allocated memory usage, such that users can timely know the status of each server and create containers based on the status of each server.

In some embodiments, status data of each server can be obtained in real time, such that the status of each server can be displayed at a corresponding position on the physical pool based on the obtained status data.

By displaying the server status based on real-time obtained status data, the real-time and effectiveness of the data can be ensured, thereby making the server status obtained by users through the displayed content more authentic and reliable.

Through the above process, the hardware environment of the big data cluster can be constructed to obtain a big data cluster that includes at least one server, such that containerization deployment is performed on the at least one server. Thus, the big data cluster can provide users with big data processing functions.

In some embodiments, the deployment interface includes a node creation region. The node creation region includes a create-node control and at least one big data component.

It should be noted that although big data components can include HDFS components, YARN components, Clickhouse components, Hive components, Knox components, monitoring tool components, and other types of components, some components are configured by default when configuring the initial server and do not require manual user operation. Therefore, not all of the above big data components are displayed in the node creation region. In general, the components displayed in the node creation region can include HDFS components, YARN components, Clickhouse components, and Hive components.

For ease of understanding, the scenarios applicable to each component are introduced below. Taking big data components including an HDFS component, a YARN component, a Clickhouse component, and a Hive component, as an example, the HDFS component can be configured to provide data storage functionality. In other words, to provide data storage functionality for users, a container corresponding to the node of the HDFS component needs to be deployed in the big data cluster to provide distributed data storage services for users through the deployed container to meet user needs.

The YARN component can be configured to provide data analysis functionality. In other words, if the data analysis functionality needs to be provided to users, a container corresponding to the node of the YARN component needs to be deployed in the big data cluster, to obtain data from the container corresponding to the node of the HDFS component through the container corresponding to the node of the YARN component, and perform data analysis based on the obtained data, to meet data analysis needs of the users.

The Hive component can convert the data stored in the container corresponding to the node of the HDFS component into a queryable data table, such that data query and processing can be carried out based on the data table to meet the data processing needs of the users.

It should be noted that although both the YARN component and the Hive component can provide the data analysis functionality for users, the difference is that if the YARN component is used to implement the data analysis process, a series of code needs to be developed to perform the corresponding data processing process based on the data processing task after submitting the data processing task to the YARN component. However, if the Hive component is used to implement the data analysis process, Structured Query Language (SQL) statements can be used to process the data processing task.

The Clickhouse component is a columnar storage database that can be configured to meet user's storage needs for a large amount of data. Compared to commonly used row storage databases, the Clickhouse component has faster reading speed, and the Clickhouse component can store data in partitions. And users can only obtain data in one or several partitions for processing according to actual needs, without obtaining all the data in the database, thereby reducing the data processing pressure of computing devices.

Taking the deployment interface shown in FIG. 4 as an example, the displayed big data components include an HDFS component, a YARN component, a Hive component, and a Clickhouse component. The "Apply" button in the deployment interface shown in FIG. 4 is the create-node control.

In some embodiments, for the step 102, in response to the node creation operation in the deployment interface, displaying the to-be-deployed node in the temporary resource pool region of the deployment interface can be implemented by the following processes:

when any big data component is selected, in response to the triggering operation on the create-node control, displaying a to-be-deployed node corresponding to the selected big data component in the temporary resource pool region.

It should be noted that different components contain different nodes. The following explains the types of nodes included in components.

The HDFS component includes a node of NameNode (nn), a node of DataNode (dn) and a node of Secondary NameNode (sn). The YARN component includes a node of ResourceManager (rm) and a node of NodeManager (nm). The Hive component includes a node of Hive (hv). The Clickhouse component includes a node of Clickhouse (ch).

Based on the above relationship between the components and nodes, the computing device can display the corresponding node in the temporary resource pool region as a to-be-deployed node based on the selected big data component.

It should be noted that since big data components may also have version differentiation, or the same big data component may have multiple versions, the node creation region can further have a set-node-parameter control. The set-node-parameter control can be configured to set the version of the to-be-deployed node.

Based on this, in some embodiments, in response to the triggering operation on the create-node control, displaying the to-be-deployed node corresponding to the selected big data component in the temporary resource pool region may include: displaying the to-be-deployed node corresponding to a version set by the set-node-parameter control in the temporary resource pool region in response to the triggering operation on the create-node control.

For example, the HDFS component and the YARN component can include a high availability (HA) version and a non-high availability version. It should be noted that the versions of the HDFS component and the YARN component need to be consistent.

Taking the deployment interface shown in FIG. 4 as an example, if the selected component is an HDFS component or a YARN component, the checkbox corresponding to "HA" under the marked text "Node Parameters" is the set-node-parameter control. If the checkbox corresponding to "HA" is selected, it means that the HDFS component or YARN component to be deployed is the HA version. If the checkbox corresponding to "HA" is not selected, it means that the HDFS component or YARN component to be deployed is the non-HA version. Additionally, it should be noted that since the Hive component and the Clickhouse component do not need to be distinguished between HA and non-HA versions, when the selected component is a Hive component or Clickhouse component, the text displayed under the marked text "Node Parameters" will be "None", thus eliminating the need to distinguish the versions of Hive and Clickhouse components.

By setting the set-node-parameter control in the deployment interface, users can choose the versions of big data components based on actual technical needs, thereby meeting customized needs.

In addition, in a case where the version has been set through the set-node-parameter control, if the node deployment has been started, the set version cannot be modified. However, if the node deployment has not been started, the user can modify the set version. Correspondingly, after the version modification, the nodes displayed in the temporary resource pool region are cleared for the user to recreate nodes.

It should be noted that when the big data component is selected, the node types and number of to-be-deployed nodes are preset each time the create-node control is triggered. In general, HDFS components, YARN components, Hive components, and Clickhouse components are most widely used in big data clusters. The following mainly uses HDFS components, YARN components, Hive components, and Clickhouse components as examples to describe.

The types and number of nodes under the initial states (i.e., when the create-node controls are first clicked) of components in different versions are as follows:

the initial state of the HDFS component in the HA version: 1 nn node, 1 sn node, and 4 dn nodes;

the initial state of the HDFS component in the non-HA version: 3 nn nodes, and 4 dn nodes;

the initial state of the YARN component in the HA version: 1 rm node, and 1 nm node;

the initial state of the YARN component in the non-HA version: 3 rm nodes, and 1 nm node;

the Hive component: 1 hv node; and the Clickhouse component: 1 ch node.

The nn node is the core node of the HDFS component, configured to provide data control function. The HDFS component in the non-HA version only includes one nn node, if the nn node fails, it will cause the HDFS component to no longer provide corresponding function. However, the HA version of the HDFS component includes three nn nodes, of which one nn node is in the Active state and the other two nn nodes are in the Standby state. At the beginning, the work can be carried out by the nn node in the Active state, and once the nn node in the Active state fails, the nn node in the Standby state can be activated to ensure the normal operation of the HDFS component, thereby achieving high availability.

Similarly, the rm node is the core node of the YARN component, configured to provide data control function. The non-HA version of the YARN component only includes one rm node, if the rm node fails, it will cause the YARN component to no longer provide corresponding function. However, the HA version of the YARN component includes three rm nodes, with one rm node in the Active state and the other two rm nodes in the Standby state. At the beginning, the work can be carried out by the rm node in the Active state, and once the rm node in the Active state fails, the rm node in the Standby state can be activated to ensure the normal operation of the YARN component, thereby achieving high availability.

Furthermore, it should be noted that for the nn and sn nodes of the HDFS component, the rm and nm nodes of the YARN component, the hv node of the Hive component, and the ch node of the Clickhouse component, the number of nodes in the initial state is determined based on the technical requirements of the Hadoop architecture. For the dn node of the HDFS component, because the default number of replicas of the HDFS component is 3, to ensure that moving nodes on each replica does not cause data loss, the number of dn nodes in the initial state is set up to 4.

It should be noted that for the HDFS component, users can increase the number of dn nodes according to actual technical requirements, but cannot increase the number of nn nodes and sn nodes. For the YARN component, users can increase the number of nm nodes according to actual technical requirements, but cannot increase the number of rm nodes. For the Hive component and the Clickhouse component, the number of corresponding nodes (i.e., hv nodes and ch nodes) cannot be increased.

For ease of understanding, the following table provides an explanation of the node types and number of the to-be-deployed nodes to be added each time a create-node control is triggered, referring to the following table 1.

TABLE 1

| Component Type | | Control clicks | |
| --- | --- | --- | --- |
| | | 1 | 2 |
| HDFS component | HA version | 3 nn 4 dn | 1 dn |
| | Non-HA version | 1 nn 1 sn 4 dn | 1 dn |
| YARN component | HA version | 3 rm 1 nm | 1 nm |
| | Non-HA version | 1 rm 1 nm | 1 nm |
| Hive component | | 1 hv | Unable to continue adding nodes |
| Clickhouse component | | 1 ch | Unable to continue adding nodes |

From the above table, it can be seen that in the case where the big data component is the HA version of the HDFS component, the first click on the create-node control can add 3 nn nodes and 4 dn nodes to the temporary resource pool region, the second click on the create-node control can add 1 dn node to the temporary resource pool region, and so on, and each subsequent click on the create-node control can add 1 dn node to the temporary resource pool region. In the case where the big data component is a non-HA version of the HDFS component, the first click on the create-node control can add 1 nn node, 1 sn node, and 4 dn nodes to the temporary resource pool region, the second click on the create-node control can add 1 dn node to the temporary resource pool region, and so on, and each subsequent click on the create-node control can add 1 dn node to the temporary resource pool region. In the case where the big data component is the HA version of the YARN component, the first click on the create-node control can add 3 rm nodes and 4 nm nodes to the temporary resource pool region, the second click on the create-node control can add 1 nm node to the temporary resource pool region, and so on, and each subsequent click on the create-node control can add 1 nm node to the temporary resource pool region. In the case where the big data component is a non-HA version of the YARN component, the first click on the create-node control can add 1 rm node and 1 nm node to the temporary resource pool region, the second click on the create-node control can add 1 nm node to the temporary resource pool region, and so on, and each subsequent click on the create-node control can add 1 nm node to the temporary resource pool region. In the case where the big data component is a Hive component, the first click on the create-node control can add one hv node to the temporary resource pool region, and subsequent clicks on the create-node control cannot increase the number of nodes corresponding to the Hive component. And in the case where the big data component is a Clickhouse component, the first click on the create-node control can add one ch node to the temporary resource pool region, and subsequent clicks on the create-node control cannot increase the number of nodes corresponding to the Clickhouse component.

Below are several exemplary node creation processes as examples to illustrate the node creation process in the present disclosure.

For example, taking the deployment interface shown in FIG. 2 as an example, when only the nodes corresponding to the non-HA version of the HDFS component need to be deployed, the HDFS component is selected in the interface shown in FIG. 2 to make the HDFS component in a selected state, and then the "Apply" button (also known as the create-node control) is clicked, such that 1 nn node, 1 sn node, and 4 dn nodes are displayed in the temporary resource pool region.

For example, taking the deployment interface shown in FIG. 2 as an example, when deploying nodes corresponding to the HDFS component, the YARN component, the Hive component, and the Clickhouse component, in the interface shown in FIG. 2, the HDFS component is selected first to make the HDFS component in the selected state, and then the "Apply" button (also known as the create-node control) is clicked to display 1 nn node, 1 sn node, and 4 dn nodes in the temporary resource pool region. Then the YARN component is selected to make the YARN component in the selected state, and the "Apply" button is clicked to display 1 rm node and 1 nm node in the temporary resource pool region. Then the Hive component is selected to make the Hive component in the selected state, and then the "Apply" button is clicked to display 1 hv node in the temporary resource pool region. Finally, the Clickhouse component is selected to make the Clickhouse component in the selected state, and then the "Apply" button is clicked to display 1 ch node in the temporary resource pool region.

For example, taking the deployment interface shown in FIG. 2 as an example, when only the nodes corresponding to the HA version of HDFS component need to be deployed, the HDFS component is selected in the interface shown in FIG. 2 to make the HDFS component in a selected state, then the checkbox corresponding to "HA" is checked, and then the "Apply" button (also known as the create-node control) is clicked, such that 3 nn nodes and 4 dn nodes are displayed in the temporary resource pool region.

For example, taking the deployment interface shown in FIG. 2 as an example, when deploying nodes corresponding to the HA version of the HDFS component, the HA version of the YARN component, the Hive component, and the Clickhouse component, in the interface shown in FIG. 2, the HDFS component is selected first to make the HDFS component in the selected state, the checkbox corresponding to "HA" is checked, and then the "Apply" button (also known as the create-node control) is clicked to display 3 nn nodes and 4 dn nodes in the temporary resource pool region. Then the YARN component is selected to make the YARN component in the selected state, then the checkbox corresponding to "HA" is checked, and then the "Apply" button is clicked to display 3 rm nodes and 1 nm node in the temporary resource pool region. Then the Hive component is selected to make the Hive component in the selected state, and then the "Apply" button is clicked to display 1 hv node in the temporary resource pool region. Finally, the Clickhouse component is selected to make the Clickhouse component in the selected state, and then the "Apply" button is clicked to display 1 ch node in the temporary resource pool region.

It should be noted that after the nodes corresponding to each big data component are deployed, the memory usage of each server can be determined based on the estimated memory usage of various types of nodes. It should be emphasized that if the HDFS component and the YARN component are deployed as the HA version, although the front-end deployment interface does not display Zookeeper (referred to as zk) nodes, zk nodes need to be deployed in the actual cluster deployment process. Therefore, when the estimated memory usage is determined, it is necessary to increase the memory usage of 3 zk nodes.

The estimated memory usage of various types of nodes can be seen in Table 2.

TABLE 2

| Big data component | Node | Memory usage (MB) |
| --- | --- | --- |
| HDFS component | nn | 2048 |
| | sn | 1024 |
| | dn | 1024 |
| YARN component | rm | 2048 |
| | nm | 4096 |
| Hive component | hc | 2048 |
| Clickhouse component | ch | 2048 |
| Zookeeper component | zk | 1024 |

The computing device can determine the estimated memory usage based on the data shown in Table 2 and the number of nodes deployed by the user.

The above process involves users selecting the required big data components based on actual needs and creating nodes according to needs. In other embodiments, the present disclosure can further provide configuration recommendation function. When users are unable to determine the type of the to-be-deployed big data component and the number of to-be-deployed nodes, the configuration recommendation function provided by the present disclosure can be used, to obtain the recommended optimal configuration manner, where the configuration manner includes the types of big data components to be deployed and the number of to-be-deployed nodes.

In some embodiments, the configuration recommendation process can be achieved through the following steps.

In step 1, a deployment instruction interface is displayed.

In step 2, a component version and a type of a to-be-deployed big data component, and target data are obtained through the deployment instruction interface. The target data is configured to indicate the number of data pieces stored per second required for data processing needs.

The deployment instruction interface can provide multiple deployable big data component options, candidate component versions, and an obtain-data control. In some embodiments, a big data component option can be set to a checkbox, such that users can select the to-be-deployed big data component based on actual needs, such that a computing device can obtain the type of to-be-deployed big data component. The form of the candidate component version can be seen in the set-node-parameter control mentioned above, which is not repeated here. The obtain-data control can be provided as an input box, such that users can input the target data indicating the number of data pieces stored per second required for data processing needs through the obtain-data control set on the deployment instruction interface, such that the computing device can obtain the target data through the deployment instruction interface.

In step 3, based on the type and the component version of the to-be-deployed big data component, the target data and a preset parameter, the recommended deployment number of each type of to-be-deployed node is determined.

It should be noted that based on the type and the component version of the to-be-deployed big data component, the recommended deployment number of nn nodes, sn nodes, rm nodes, hv nodes, and ch nodes can be determined. The recommended deployment number of dn and nm nodes can be determined by following steps.

For ease of understanding, the preset parameter is first introduced, which can be a preset threshold for the number of data pieces stored per second. Based on this, when the recommended deployment number of dn nodes is determined, the target data and the preset parameter can be compared. When the target data is less than or equal to the preset parameter, the recommended deployment number of dn nodes can be determined as 4. When the target data is greater than the preset parameter, the recommended deployment number of dn nodes can be determined by the formula of "recommended deployment number of dn nodes=target data/(preset parameter/4)". When the recommended deployment number of nm nodes is determined, the recommended deployment number of nm nodes can also be determined based on the comparison result of the target data and the preset parameter. When the target data is less than or equal to the preset parameter, the recommended deployment number of nm nodes can be determined as 1. When the target data is greater than the preset parameter, half of the recommended deployment number of dn nodes can be determined as the recommended deployment number of nm nodes.

In addition, the computing device can further determine the estimated memory usage based on the recommended deployment number of various types of to-be-deployed nodes. When the estimated memory usage is determined, it should be emphasized that if the HDFS component and the YARN component are deployed as the HA version, although the front-end deployment interface does not display Zookeeper (referred to as zk) nodes, zk nodes need to be deployed in the actual cluster deployment process. Therefore, when the estimated memory usage is determined, it is necessary to increase the memory usage of 3 zk nodes.

Taking the deployment of the HA version of the HDFS component, the HA version of the YARN component, the Hive component, and the Clickhouse component as examples, with target data of 40 w/s (the number of data pieces stored per second) and a preset parameter of 20 w/s, the estimated memory usage and the recommended deployment number of various types of nodes are determined.

The recommended deployment number of dn nodes is 40/(20/4)=8, and the recommended deployment number of nm nodes is 4. For ease of viewing, the recommended deployment number of various types of nodes is presented in the form of a table, as shown in Table 3.

TABLE 3

|  | Number of nodes | Estimated memory usage |
| --- | --- | --- |
| HDFS component | 3nn, 3zk, 8dn | 17408 MB = 17 G |
| YARN component | 3rm, 4nm | 22528 MB = 22 G |
| Hive component | 1hv | 2048 MB |
| Clickhouse component | 1ch | 2048 MB |
| Total | 3nn, 8dn, 3rm, 4nm, 1hv, 1ch, (3zk) | 44032 MB = 43 G |

It should be noted that after the recommended deployment number of various types of to-be-deployed nodes is determined, the determined recommended deployment number can be displayed in the deployment instruction interface for users to view.

In some embodiments, prompt information can further be displayed in the deployment instruction interface. The prompt information can be configured to prompt that the recommended deployment number is for reference only, and the user can increase or decrease the number of to-be-deployed nodes according to the actual situation.

In addition, users can further deploy the to-be-deployed nodes to multiple physical pools based on actual situation. In addition, it should be noted that if the to-be-deployed node is the HA version, users can be advised to set up at least 3 physical pools through the visualized interface to deploy 3 nn nodes or 3 rm nodes to different servers, to truly achieve high availability of the big data cluster.

Additionally, it should be noted that the HA version of the HDFS component and the YARN component require the use of a Zookeeper cluster. Therefore, if the user selects the HA version of the HDFS component or the YARN component as the big data component, the computing device will default to deploy a 3-node Zookeeper cluster on the server corresponding to the HDFS component or the YARN component. Therefore, the Zookeeper component does not need to be displayed in the front-end deployment interface, the deployment of the Zookeeper component can also be completed when needed. In the non-HA version of the HDFS component and the YARN component, and other components, there is no need to deploy the Zookeeper component.

In addition, it should be emphasized that there are dependency relationships between different big data components. Therefore, when creating nodes, the relevant technical personnel need to select big data components based on the dependency relationships between the components, so as to create nodes.

For example, the deployment and use of nodes corresponding to the YARN component need to be based on the HDFS component, which means that the nodes corresponding to the HDFS component need to be deployed first, and then the nodes corresponding to the YARN component can be deployed. If the nodes corresponding to the YARN component are directly deployed without first deploying the nodes corresponding to the HDFS component, the front-end page will prompt an error. The deployment and use of nodes corresponding to the Hive component need to be based on the HDFS and YARN components, which means that the nodes corresponding to the HDFS and YARN components need to be deployed first, and then the nodes corresponding to the Hive component can be deployed. If the nodes corresponding to the Hive component are directly deployed without first deploying the nodes corresponding to the HDFS and YARN components, the front-end page will prompt an error. The nodes corresponding to the Clickhouse component are independent nodes and have no dependency relationship with the nodes corresponding to other components.

Figure 5:
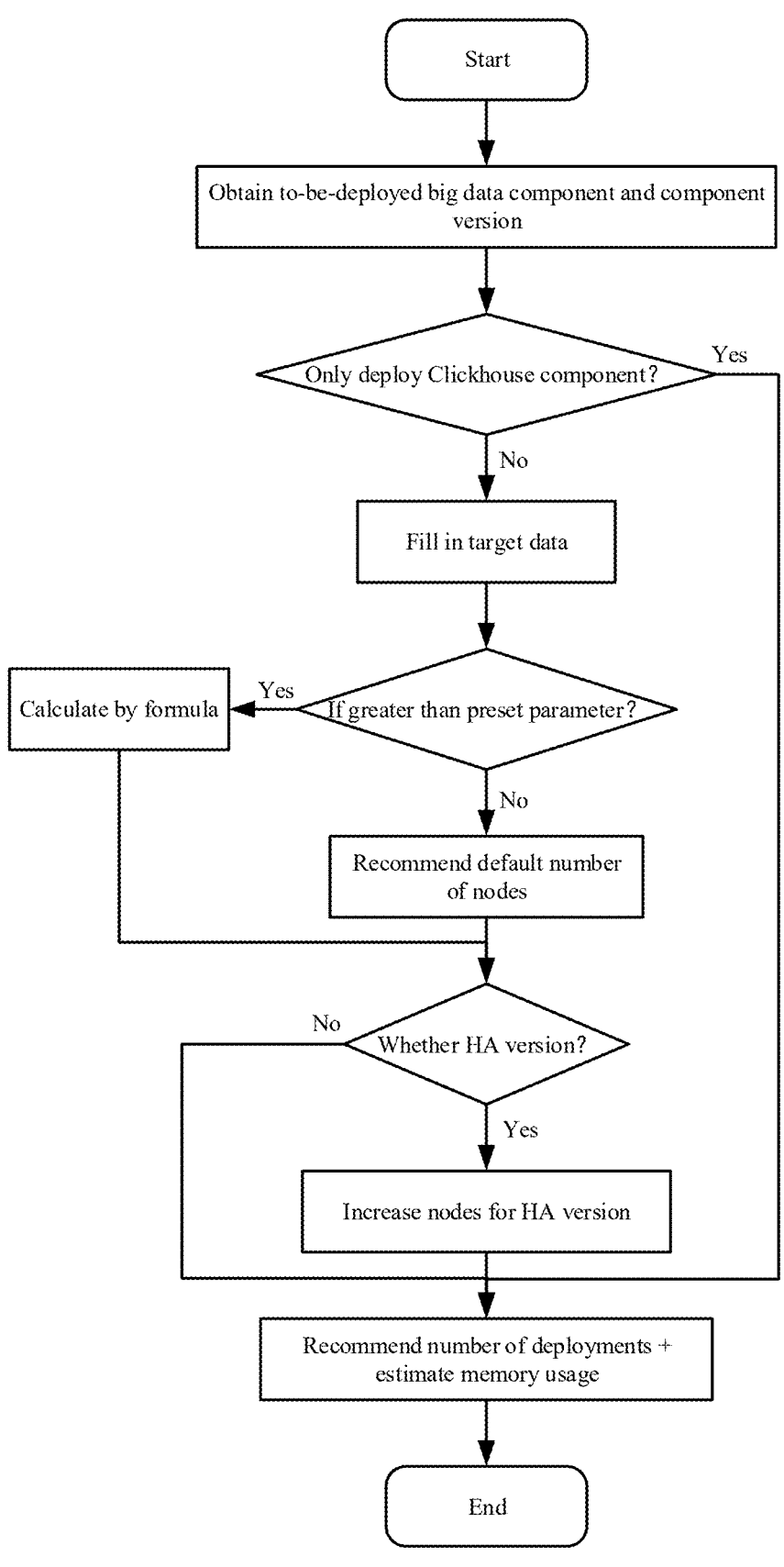
FIG. 5 is a flowchart for recommending a deployment process according to an embodiment of the present disclosure.

The flow of the above process for deployment recommending can be seen in FIG. 5. FIG. 5 is a flowchart for recommending deployment process according to an embodiment of the present disclosure. As shown in FIG. 5, the type and the component version of the to-be-deployed big data component can be obtained through the deployment instruction interface. If the to-be-deployed big data component only includes the Clickhouse component, the recommended deployment number of the ch nodes can be directly determined to be 1, and thus, the estimated memory usage can be determined. In the case where the to-be-deployed big data component further includes other components besides the Clickhouse component, the target data can be obtained through the deployment instruction interface to determine whether the target data is greater than the preset parameter. In the case where the target data is greater than the preset parameter, the recommended deployment number of nodes can be determined through the formula described in the above process, and in the case where the target data is less than or equal to the preset parameter, a default recommended number of nodes can be used as the recommended deployment number. Furthermore, it is necessary to determine whether the to-be-deployed nodes include nodes for HA version based on the component version. In the case where the to-be-deployed nodes include nodes for HA version, it is necessary to add nodes relevant to HA version (such as zk nodes), and then determine the estimated memory usage based on the recommended deployment number and the increased nodes relevant to HA version. In the case where nodes relevant to HA version do not need to be added, the estimated memory usage is simply determined based on the recommended deployment number.

It should be noted that whether users create to-be-deployed nodes according to their own needs or create to-be-deployed nodes based on the number of nodes recommended by the computing device, after to-be-deployed nodes are created, the to-be-deployed nodes can be displayed in the temporary resource pool region. Users can drag and drop the to-be-deployed nodes in the temporary resource pool region to the physical pool of the deployment resource pool region, such that the computing device can through the step 103, respond to the drag-and-drop operation on the to-be-deployed nodes in the temporary resource pool region, and display the to-be-deployed nodes in the physical pool in the deployment resource pool region of the deployment interface.

The deployment resource pool region can include at least one physical pool. In some embodiments, for the step 103, in response to the drag-and-drop operation on the to-bedeployed nodes in the temporary resource pool region, displaying the to-be-deployed nodes in the physical pool in the deployment resource pool region of the deployment interface may include: for any to-be-deployed node, in response to the drag-and-drop operation on the to-be-deployed node, displaying the to-be-deployed node in the physical pool indicated at the end of the drag-and-drop operation.

By providing drag-and-drop functionality for the nodes displayed in the deployment interface, users can drag and drop each node to the corresponding physical pool according to actual technical needs to meet customized needs.

In some embodiments, the deployment interface can further be provided with an automatic-allocating control, such that users can automatically allocate to-be-deployed controls in the temporary resource pool region to various physical pools within the deployment resource pool region through the automatic-allocating control.

Figure 6:
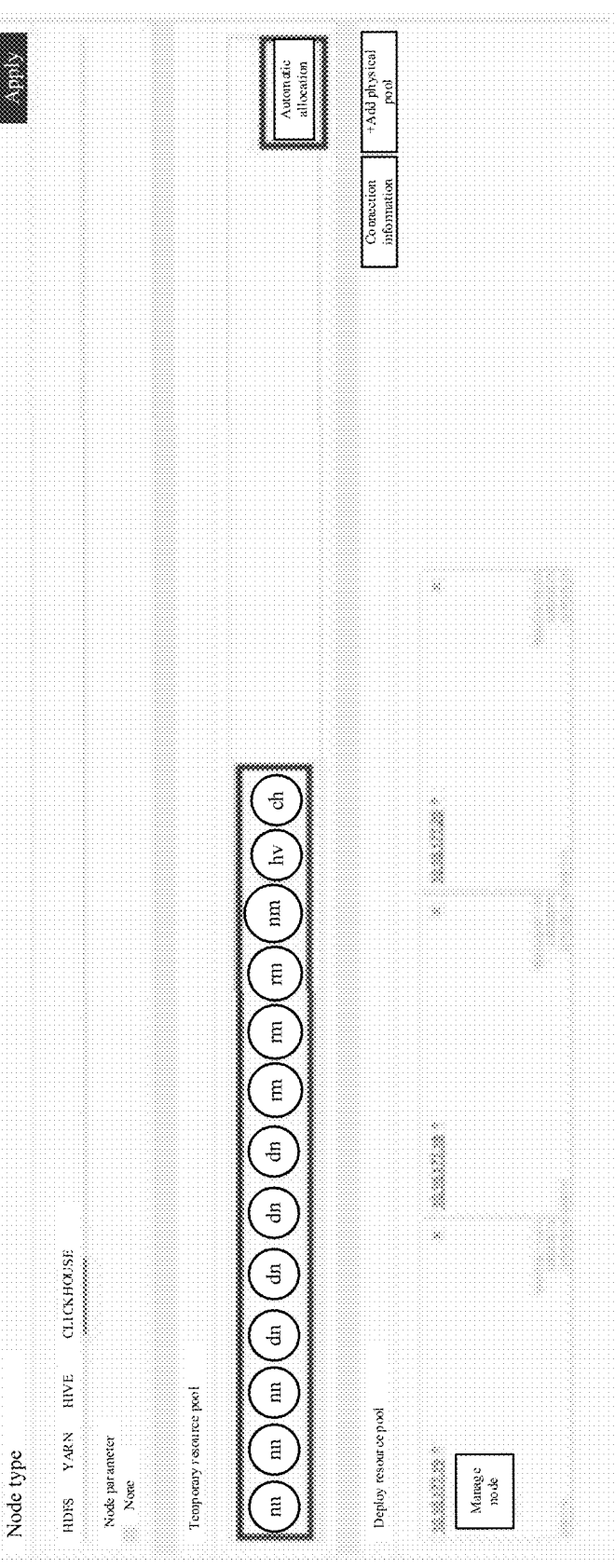
FIG. 6 is a schematic diagram of a deployment interface according to an embodiment of the present disclosure.

Refer to FIG. 6, a schematic diagram of a deployment interface according to an embodiment of the present disclosure, the "automatic allocating" button in FIG. 6 is the automatic-allocating control, and nodes corresponding to the HDFS component (i.e. 3 nn nodes and 4 dn nodes), nodes corresponding to the YARN component (i.e. 3 rm nodes and 1 nm node), nodes corresponding to the Hive component (i.e. 1 hv node) and nodes corresponding to the Clickhouse component (i.e. 1 ch node) have been added to the temporary resource pool, and by triggering the "automatic allocating" button, these nodes in the temporary resource pool can be automatically assigned to each physical pool of the deployment resource pool.

By setting the automatic-allocating control in the deployment interface, users can allocate the to-be-deployed nodes to each physical pool of the deployment resource pool without manually dragging and dropping them, which can simplify user operations and improve the allocation efficiency of nodes.

Figure 7:
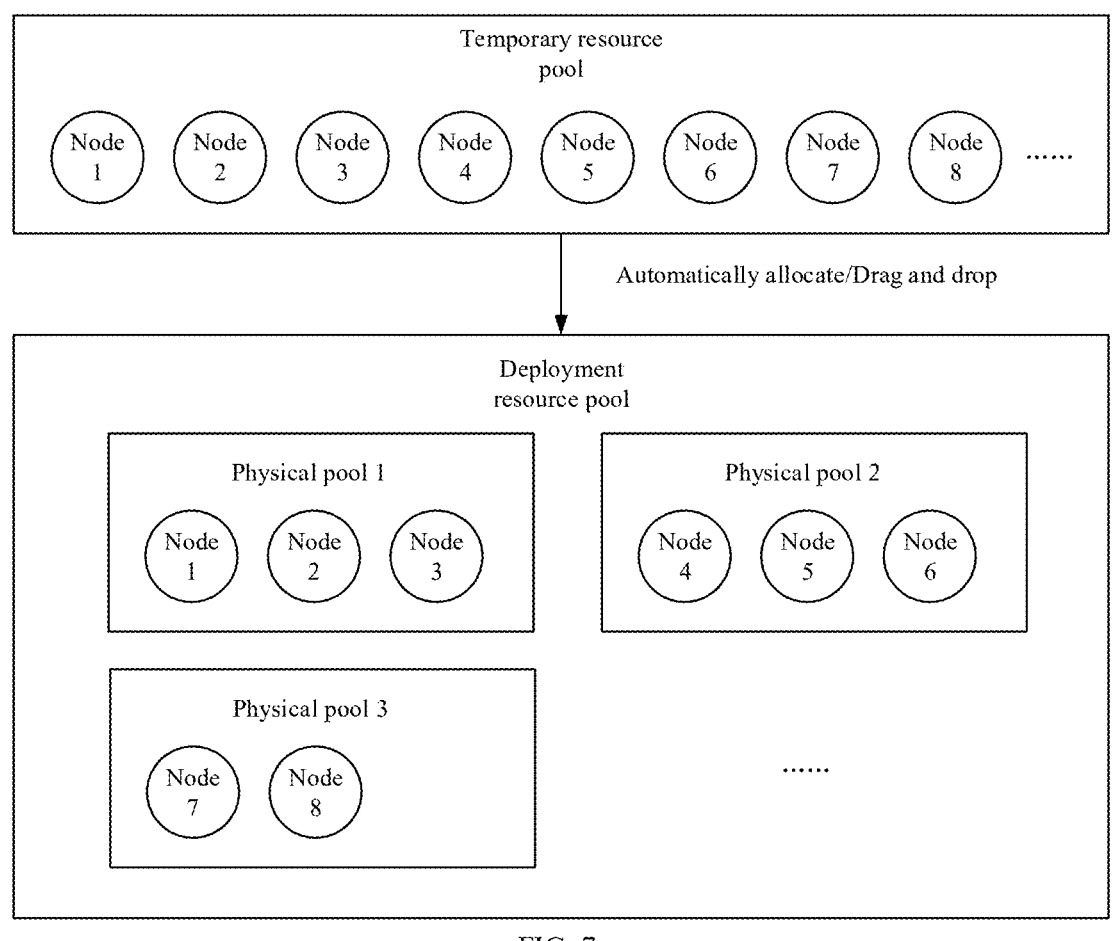
FIG. 7 is a schematic diagram of a node allocating process according to an embodiment of the present disclosure.

Referring to FIG. 7, a schematic diagram of a node allocating process according to an embodiment of the present disclosure, taking the temporary resource pool region including 8 nodes as an example, these 8 nodes can be allocated to 3 physical pools through automatically allocating or dragging and dropping. For example, node 1, node 2, and node 3 are allocated to physical pool 1; node 4, node 5, and node 6 are allocated to physical pool 2; node 7 and node 8 are allocated to physical pool 3; where one physical pool corresponds to one server in the big data cluster. When each node is deployed on a server, the node is deployed as a container, thus a node is a container in a server.

In addition, the to-be-deployed nodes in the temporary resource pool region further support drag and drop deletion function. Users can delete a to-be-deployed node in the temporary resource pool region by dragging and dropping the to-be-deployed node to a designated location. Taking the deployment interface shown in FIG. 2 as an example, a location of "drag and drop a node here to delete" in the bottom left corner of the interface is the designated location.

It should be emphasized that since the temporary resource pool region is filled with temporary nodes, when leaving the page or refreshing the page, the page will be reset, such that the page will clear all the nodes in the temporary resource pool.

The above processes are mainly an introduction to a drag-and-drop process. It should be noted that compared to a drag-and-drop function on an HTML5 page in the related technology, in the present disclosure, a drag-and-drop component for convenient operation is provided, such that developers can control a drag-and-drop process more precisely and obtain more comprehensive and simple data information, thereby avoiding excessive redundant code generation, simplifying development work, and improving code quality and code readability.

In some embodiments, the process of drag-and-drop for a node based on a new drag-and-drop function can include following steps.

In step 1, attribute data of an operation object corresponding to a node displayed on a target interface is obtained, where the operation object is an object defined in a program code corresponding to the target interface.

The target interface can be the deployment interface, and the operation object can be a Document Object Model (DOM) object.

In step 2, the obtained attribute data is associated with a corresponding node.

In step 3, in response to a drag-and-drop operation on the node on target interface, based on operation data corresponding to the drag-and-drop operation, the attribute data associated with the node is modified, to enable node to be displayed at a position where the drag-and-drop operation ends based on modified attribute data.

By obtaining the attribute data of the operation object corresponding to the node displayed on the target interface in the program code and associating the obtained attribute data with the corresponding node, the attribute data associated with the node can be modified directly based on the operation data corresponding to the drag-and-drop operation when dragging and dropping the node on the target interface, without the need to search for the operation object. Therefore, through a simple operation process, dragging and dropping the node can be displayed, such that the node is displayed at the position where the drag-and-drop operation ends based on the modified attribute data.

When obtaining the attribute data of the operation object corresponding to the node displayed on the target interface, based on a position of the node displayed on the target interface, it can be determined which operation object the node corresponds to, and thereby the attribute data of the operation object is obtained.

When associating the obtained attribute data with the corresponding node, the obtained attribute data can be configured as marking information to mark the corresponding node. At the same time, a node identification (ID) can further be configured as marking information to mark the corresponding attribute data. Thereby, the association between the attribute data and the node is achieved. In some embodiments, other manners can be used to achieve the association between the attribute data and the node, and the present disclosure does not limit which manner to use.

Through the above process, bidirectional binding between the attribute data and the node can be achieved, such that the attribute data can be modified directly based on the operation on the node, without modifying the operation object.

In some embodiments, the attribute data can include location data. Therefore, in response to the drag-and-drop operation on the node on the target interface, based on the operation data corresponding to the drag-and-drop operation, modifying the attribute data associated with the node may include: modifying the location data in the attribute data associated with the node in response to the drag-and-drop operation on the node on the target interface, based on the location data corresponding to a position where the drag-and-drop operation ends.

In some embodiments, the attribute data may further include other types of data, which is not limited in the present disclosure. However, regardless of the type of the attribute data, modifying the attribute data can be achieved through the following steps.

In step 1, in response to the drag-and-drop operation on the node on the target interface, through an attribute acquisition instruction, based on the operation data corresponding to the drag-and-drop operation, to-be-modified attribute data is obtained.

In step 2, through an attribute setting instruction, an operation object corresponding to the to-be-modified attribute data is determined.

In step 3, based on the to-be-modified attribute data, attribute data corresponding to the determined operation object is modified.

The attribute acquisition instruction can be an instruction of "getAttribute", and the attribute setting instruction can be an instruction of "setAttribute".

Figure 8:
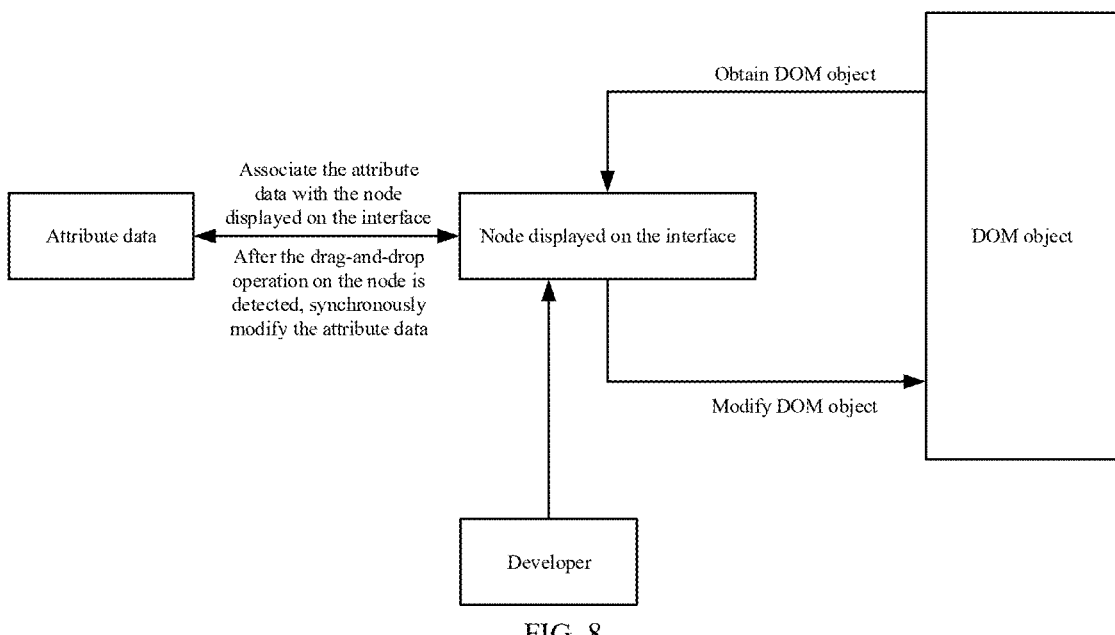
FIG. 8 is a schematic diagram of a principle of a drag-and-drop function according to an embodiment of the present disclosure.

Referring to FIG. 8, a schematic diagram of a principle of a drag-and-drop function according to an embodiment of the present disclosure, taking the operation object as a DOM object as an example, by associating the attribute data with the node displayed on the interface, after the drag-and-drop operation on the node is detected, the attribute data can be synchronously modified directly based on the drag-and-drop operation. Inside the drag-and-drop component, based on the operated node, the corresponding DOM object can be determined, so as to modify the DOM object.

It should be noted that for a native drag-and-drop function of an HTML5 page, it is necessary to obtain an operation object corresponding to the dragged and dropped node through the drag-and-drop event, and then obtain the necessary logic for a service based on the attribute data corresponding to the operation object. For example, a DOM object is obtained to be assigned to a variable of "item", through the instruction of "item. getAttribute", the attribute data of the DOM object is obtained, and through the instruction of "item. setAttribute", the attribute data is modified, so as to display the node according to the drag-and-drop operation.

In the present disclosure, by associating attribute data with a node in advance, when the node is dragged and dropped, the attribute data can be directly modified. The processes of searching for the operation object and modifying the operation object are encapsulated within the drag-and-drop component, such that users only need to pay attention to the modification of data. Thus, in the actual code implementation, only the to-be-modified attribute data is needed to be assigned to a variable of "i", and the attribute data can be modified through the instruction of "i. isDeploy". It seems that only one word is simplified here, but in actual development, for the native drag-and-drop function of an HTML5 page, a large amount of attribute data is written in the code, such that it is very complicated to operate the operation object, and the readability is poor. The operation data can make the code clear and brief, and attention is only needed to be paid to the change of the data, and not to the modification of the operation object.

It should be noted that the above process is illustrated by directly dragging and dropping a node for moving as an example, that is, in the example, after the node is dragged and dropped, the node is deleted from a server where the node is located before being dragged, and the node is displayed only in a server where the node is located after being dropped, to achieve a drag-and-drop effect for moving. In other embodiments, the node can further be displayed in the server where the node is located before being dragged and in the server where the node is located after being dropped, to achieve a drag-and-drop effect for copying.

In some embodiments, when the node meets a set condition, in response to the drag-and-drop operation on the node on the target interface, a temporary variable can be generated for the node, and through the temporary variable, the attribute data of the node before modification can be stored.

For example, through the temporary variable, location data of the node before being dragged can be stored. The location data can be a server ID corresponding to a physical pool where the node is located and an index value of the node in the server.

It should be noted that through the above process, the node can be displayed in both the server where the node is located before being dragged and the server where the node is located after being dropped. To facilitate user differentiation, these two nodes can further be displayed in different patterns.

In some embodiments, the attribute data may further include pattern data. The pattern data is configured to indicate a display pattern of a node, such as a border pattern (solid or dashed) of a node, a color of a node, and so on.

In some embodiments, in response to the drag-and-drop operation on the node on the target interface, the pattern data included in the attribute data stored in the temporary variable is modified to first pattern data, and the pattern data included in the attribute data associated with the node is modified to second pattern data, such that the node before being dragged and the node copied based on the drag-and-drop operation on the node can be displayed in different patterns, which is convenient for the user to distinguish.

Figure 9:
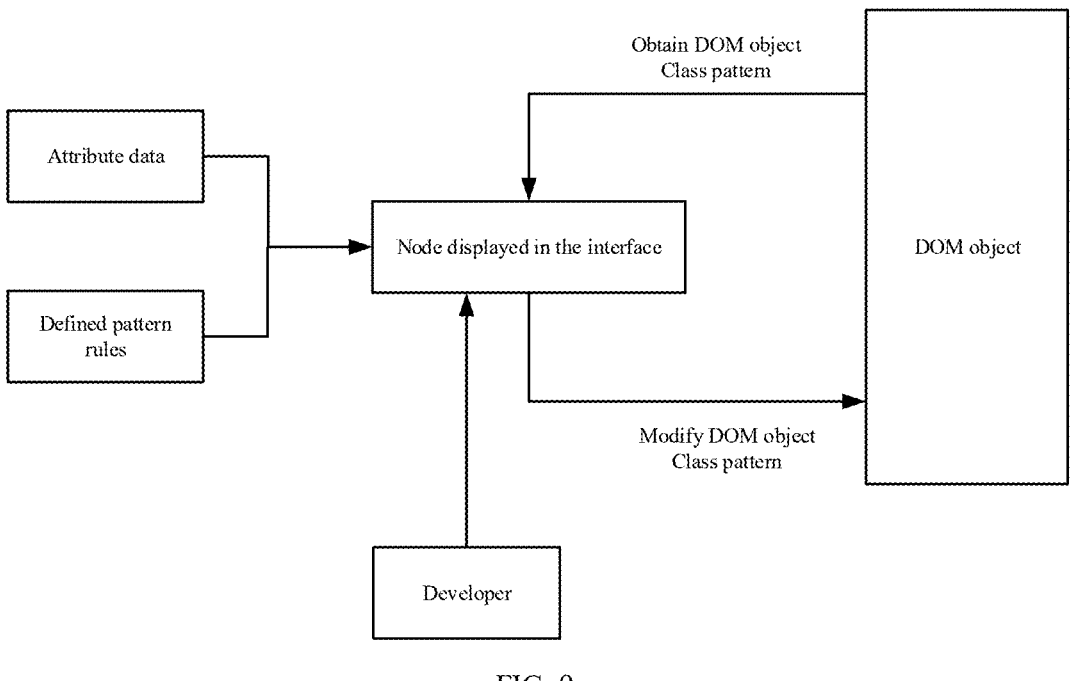
FIG. 9 is a schematic diagram of a principle of modifying pattern data according to an embodiment of the present disclosure.

Referring to FIG. 9, a schematic diagram of a principle of modifying pattern data according to an embodiment of the present disclosure, taking the operation object as a DOM object as an example, the pattern data is configured as the attribute data in advance, and associated with the node displayed in the interface, such that after a drag-and-drop operation on the node is detected, the pattern data of the node can be directly modified. Within the drag-and-drop component, based on the node operated, the corresponding DOM object can be determined, and then the pattern data of the DOM object can be modified.

In some embodiments, the attribute data can further include behavior data. The behavior data is configured to indicate whether a node needs to display prompt information when being dragged and dropped.

Therefore, in response to the drag-and-drop operation on the node in the target interface, the attribute data associated with the dragged and dropped node can be obtained. In a case that the behavior data included in the attribute data indicates that the node needs to display prompt information when being dragged and dropped, the prompt information is displayed. The prompt information is configured to prompt based on the current drag-and-drop operation. The prompt information can be a pop-up prompt, a message reminder, etc.

By associating the attribute data with the node, the operation process can be better controlled. For example, by simply determining certain values in the marked attribute data, other behaviors such as a pop-up prompt and a message reminder can be triggered during the drag-and-drop process, without the need to obtain the node multiple times, simplifying the operation logic.

In addition, the above method can support the drag and drop of multiple nodes in different servers, thereby improving the flexibility of the drag-and-drop process.

It should be noted that after all the to-be-deployed nodes in the temporary resource pool region are dragged and dropped to the deployment resource pool region, through step 104, in response to a start deployment operation in the deployment interface, the containers corresponding to the to-be-deployed nodes can be deployed on the server corresponding to the physical pool according to the physical pool where the to-be-deployed nodes are located.

In some embodiments, for the step 104, when in response to the start deployment operation in the deployment interface, deploying the containers corresponding to the to-be-deployed nodes on the server corresponding to the physical pool according to the physical pool where the to-be-deployed nodes are located, the following steps can be included.

In step 1041, in response to a start deployment operation, based on the component type of the big data component to which the to-be-deployed node belongs, a target plugin is determined.

The target plugin can be a binary package developed by developers according to unified development specification. After the development of the target plugin is completed, developers can upload the target plugin to the initial server of the big data cluster, such that the initial server can store the target plugin at a set location in the big data cluster. The set location can be in the file directory of "plugins" in the initial server.

It should be noted that different types of components can correspond to different target plugins, but the development process of each plugin needs to follow the plugin development specification. The "start" method is used to start the service, the "restart" method is used to restart the service, and the "decommission" method is used to decommission the node.

In step 1042, through the target plugin, a target interface on the server corresponding to the physical pool is started.

In step 1043, through the target interface, a container corresponding to the to-be-deployed node is deployed on the server corresponding to the physical pool.

In some embodiments, the above step 1043 can be achieved through the following steps.

In step 1043-1, a first configuration file is read through the target plugin to obtain a target installation environment from the first configuration file.

The first configuration file can be an "app.json" configuration file. In some embodiments, the first configuration file can include an image name, a version number, a Docker network name, MYSQL information for storing data, RabbitMQ information, etc.

In some embodiments, the target installation environment can be determined based on the Docker network name and the image name included in the first configuration file. The target installation environment can be the Docker network environment corresponding to the HDFS component, the Docker network environment corresponding to the YARN component, the Docker network environment corresponding to the Hive component, the Docker network environment corresponding to the Clickhouse component, and so on.

In step 1043-2, the configuration file of the target installation environment of the server is modified through the target interface, so as to deploy the container corresponding to the to-be-deployed node on the server corresponding to the physical pool.

It should be noted that different target installation environments correspond to different configuration files, so when deploying containers corresponding to different components, the configuration files that need to be modified are also different. When a container corresponding to the HDFS component is deployed, the "core-site.xml" and "hdfs-site.xml" configuration files need to be modified. When a container corresponding to the YARN component is deployed, the "yarn-site.xml" configuration file needs to be modified. When a container corresponding to the Clickhouse component is deployed, the "config.xml" and "users.xml" configuration files need to be modified. Additionally, since the above deployment process is carried out in a big data cluster, it is also necessary to modify the configuration files (such as "workers") that need to be modified during cluster startup. However, it should be emphasized that these complex deployment processes do not require manual modification, and the program can automatically generate parameters and complete the modification of configuration files.

Figure 10:
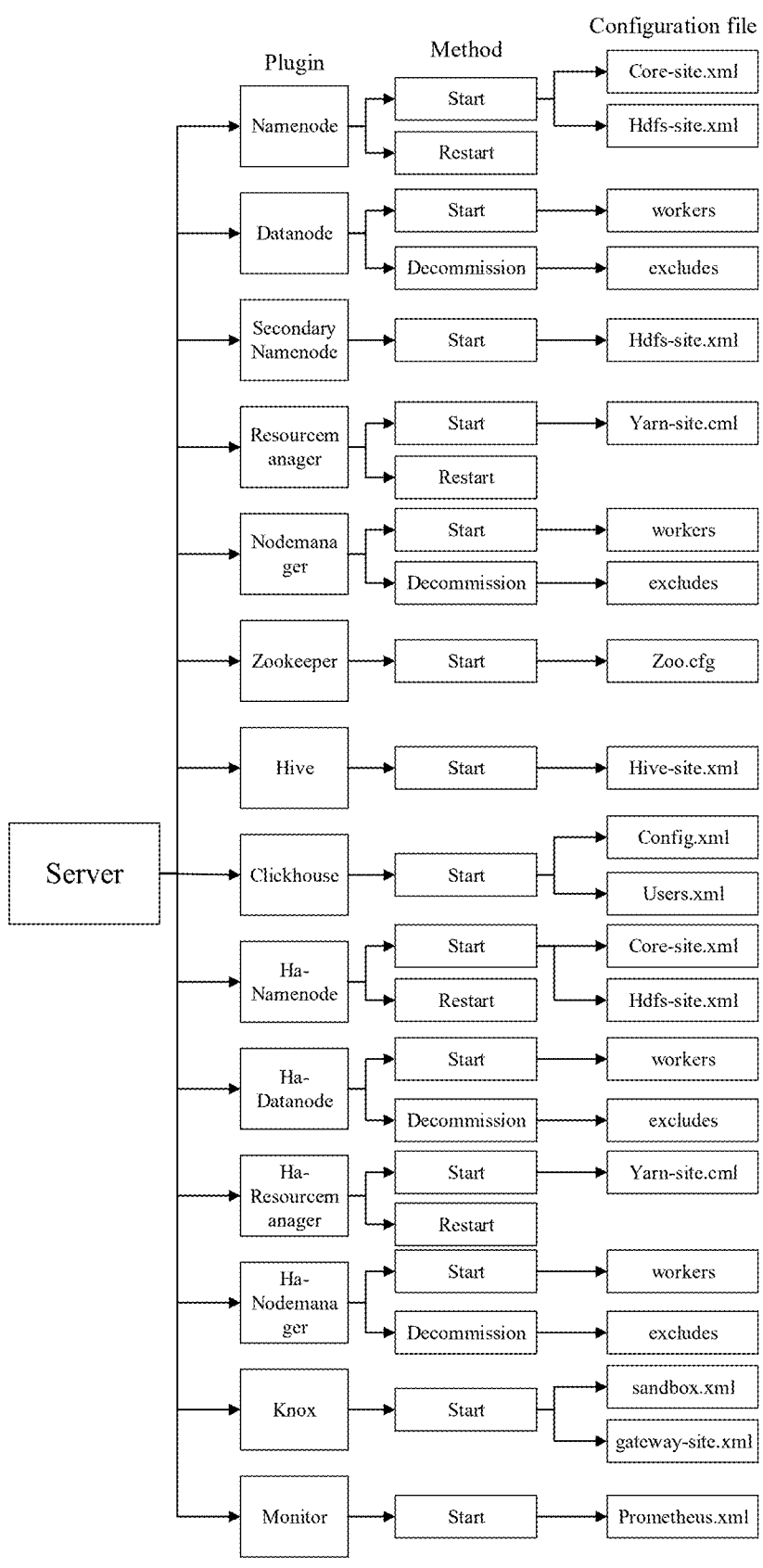
FIG. 10 is a schematic diagram of configuration files that need to be modified of various big data components when perform different operations according to an embodiment of the present disclosure.

For ease of viewing, the configuration files that need to be modified of respective components when perform different operations are presented in the form of a graph. Referring to FIG. 10, FIG. 10 is a schematic diagram of configuration files that need to be modified of various big data components when perform different operations.

Through the aforementioned plugin development process, plugin hot swapping and unified development can be achieved, reducing the technical threshold for cluster building. Moreover, for developers, plugins have template unifying methods, configurations, and functions according to unified development specifications, which can not only increase readability, but also reduce conflicts between plugins. For users, plugins are standardized and encapsulated, allowing them to manipulate plugins without understanding the execution of backend plugins, thereby reducing the potential for problems.

By using plugins, services can be deployed in containers to achieve lightweight of the big data cluster and solve resource waste issues. By starting pre-packaged image packages, plugins can achieve environment constructing and improve constructing efficiency. Moreover, using Docker and plugins, servers can be easily moved subsequently, thereby reducing development and maintenance costs.

After the configuration file is modified, program automatically completes operations such as copying, unifying configuration between containers, and starting services to complete container deployment. For example, after the configuration file is modified, container deployment can be achieved through the following steps.

In step 1, based on the to-be-deployed node and the physical pool in which the to-be-deployed node is located, a first request message is generated. The first request message is configured to indicate the deployment of the container corresponding to the to-be-deployed node on the server corresponding to the physical pool.

In some embodiments, request message data in JSON format can be generated based on the to-be-deployed node and the physical pool where the to-be-deployed node is located, thereby the generated request message data in JSON format can be used as the first request message, such that container deployment can be implemented based on the first request message subsequently.

It should be noted that the first request message can carry information corresponding to n to-be-deployed nodes, for example, the first request message can carry the container name (containerName) and the container type (containerType) of the container to be created corresponding to each to-be-deployed node.

In some embodiments, after the first request message is generated, the first request message can be stored in the first message queue, such that the first request message can be obtained from the first message queue subsequently to execute the step of determining the deployment operation type corresponding to the to-be-deployed node and the to-be-deleted container in the deployed containers based on the first request message, and the deployed containers and the to-be-deleted container in the deployed containers on the server corresponding to the physical pool.

By using a message queue to store a request message, synchronous processing for a user request on the display side and asynchronous processing on the background can be achieved. Therefore, it can ensure that users continue to operate through the deployment interface without affecting the processing process on the background when the current request message is not really processed, so as to ensure that subsequent user requests can be timely responded to.

In some embodiments, after the first request message is generated, the data format of the first request message can be verified, and/or the deployment data carried by the first request message can be verified according to a preset deployment rule. If the verification is successful, the first request message can be stored in the first message queue.

By verifying the first request message, the legality and validity of the first request message can be ensured, thereby ensuring the security of the processing process.

In step 2, based on the first request message and the deployed containers on the server corresponding to the physical pool, the deployment operation type corresponding to the to-be-deployed node and the to-be-deleted container in the deployed containers are determined. The deployment operation types include node adding, node moving, and node unchanging.

In some embodiments, the containers to be created corresponding to the to-be-deployed nodes carried by the first request message can be compared with the deployed containers on the server to determine which to-be-deployed node needs to be added (i.e., a container corresponding to the to-be-deployed node need to be created in the server), which to-be-deployed node needs to be moved (i.e., a container corresponding to the to-be-deployed node need to be moved from one server to another), which to-be-deployed node does not need to be changed, and which deployed container needs to be deleted (i.e., the corresponding deployed container needs to be deleted from the server).

Below are several specific examples to introduce the process described in step 2. For ease of understanding, the container types corresponding to different containerType values are first introduced below.

ContainerType=1→NameNode;
ContainerType=1→DataNode;
ContainerType=3→ResourceManager;
ContainerType=4→NodeManager;
ContainerType=5→Secondary NameNode;
ContainerType=6→Clickhouse;
ContainerType=7→Hive;
ContainerType=8→Zookeeper;
ContainerType=11→HANameNode;
ContainerType=12→HADataNode;
ContainerType=13→HAResourceManager;
ContainerType=14→HANodeManager.

Based on the above content, the following examples are introduced.

Figure 11:
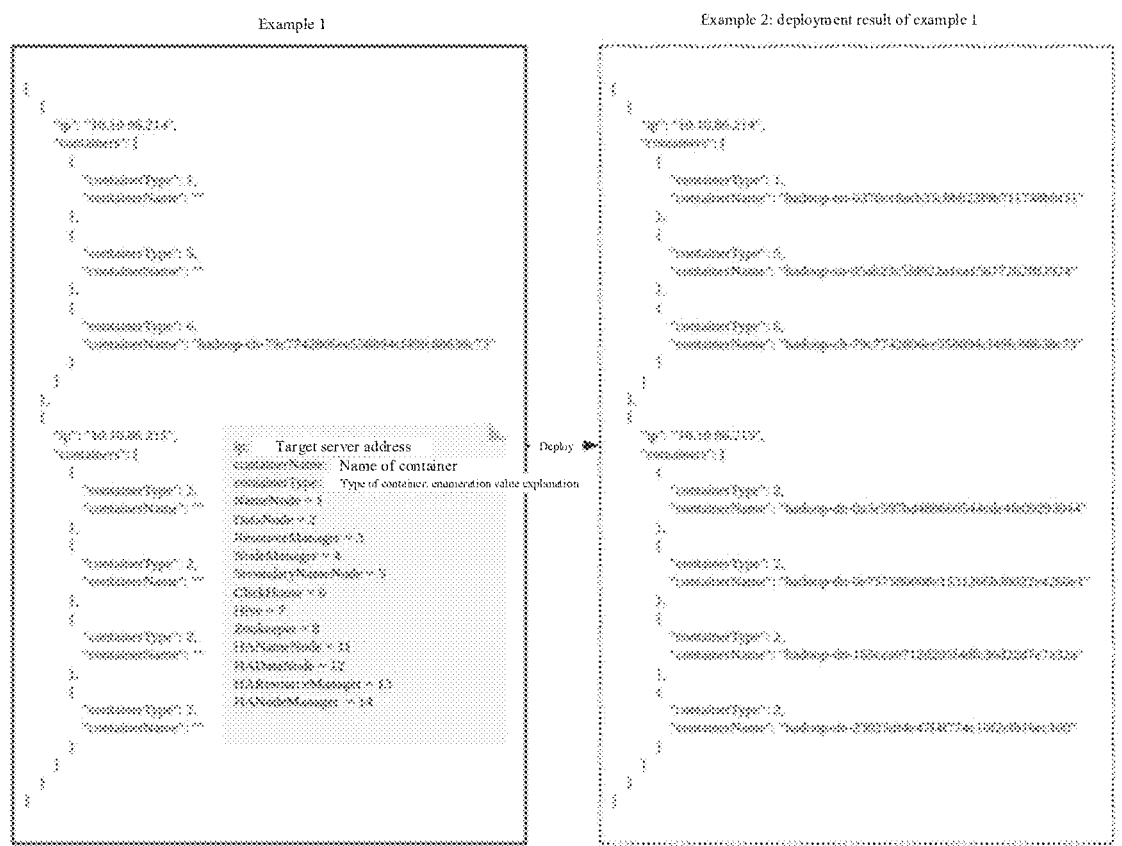
FIG. 11 is a schematic diagram of deployment data according to an embodiment of the present disclosure.

In Example 1, there are two servers (with server IDs of 10.10.86.214 and 10.10.86.215, respectively), and the containers that need to be deployed on each server can be seen in FIG. 11. FIG. 11 is a schematic diagram of deployment data according to an embodiment of the present disclosure. As shown in FIG. 11, on server 10.10.86.214, there are three containers that need to be deployed, where two containers with containerType 1 and containerType 5 are with "containerName" being empty, indicating that the containers corresponding to the two nodes of NameNode and Secondary NameNode are the new containers that need to be deployed, thus it can be determined that the deployment operation types of the two nodes of NameNode and SecondaryNameNode are node adding. The "containerName" corresponding to containerType 6 is not empty, indicating that the container corresponding to the ClickHouse node has been previously deployed. And on server 10.10.86.215, there are 4 containers that need to be deployed, with containerTypes of 2, indicating that the new containers corresponding to 4 nodes of DataNode need to be deployed.

After the deployment operation of Example 1 is completed, the deployment result data shown in Example 2 is obtained. By comparing the deployment results of Example 1 and Example 2, it can be determined that the container with containerType 6 in Example 2 does not appear in this deployment, indicating that the component has been deleted during this deployment.

Figures 12, 13:
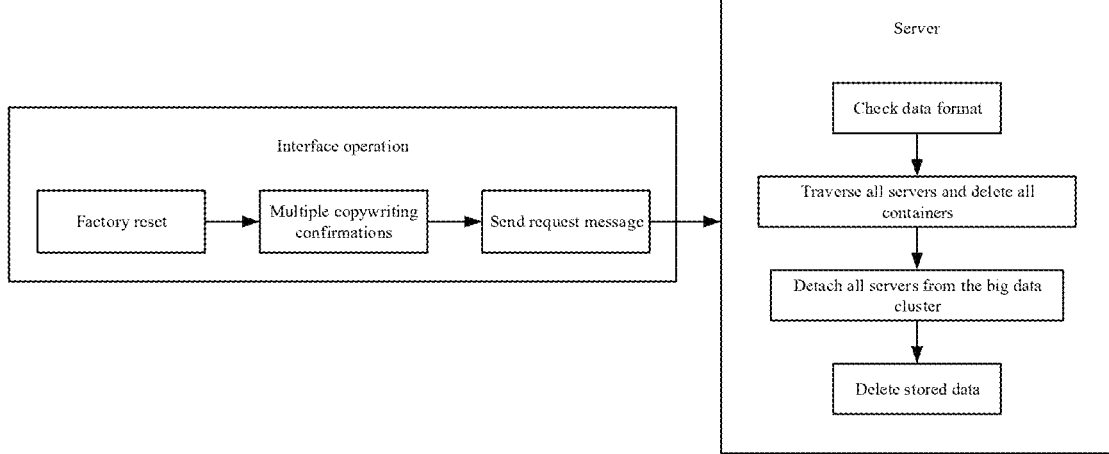
FIG. 12 is a schematic diagram of deployment data according to an embodiment of the present disclosure.
FIG. 13 is a flowchart of a process for restoring factory settings according to an embodiment of the present disclosure.

In Example 3, there are two servers (with server IDs of 10.10.86.214 and 10.10.86.215, respectively). The containers that need to be deployed on each server can be seen in FIG. 12. FIG. 12 is a schematic diagram of deployment data according to an embodiment of the present disclosure. As shown in FIG. 12, two containers with containerType 1 and 5 on server 10.10.86.214 have been deployed before, and the IP addresses of the two containers in this deployment are not changed, indicating the containers corresponding to the two nodes of NameNode and SecondaryNameNode do not need to be redeployed in this deployment, so it can be determined that the deployment operation types of the two nodes of NameNode and SecondaryNameNode are node unchanging. The container with containerType 2 has been previously deployed, and the IP address thereof for this deployment has been changed from 10.10.86.215 to 10.10.86.214, indicating that the container has been deployed and moved from server 10.10.86.214 to server 10.10.86.215, and therefore, it can be determined that the deployment operation type of the DataNode node is node moving. The containerName of a container with containerType 7 is empty, indicating that the container corresponding to the Hive node is a new container that needs to be deployed, and therefore, it can be determined that the deployment operation type of the Hive node is node adding. And on server 10.10.86.215, there are a total of 3 containers that need to be deployed, with container-Types of 2, and the IP addresses thereof are not changed during this deployment, indicating that the deployment operation types of all 4 DataNode nodes are node unchanging.

After the deployment operation in Example 3 is completed, the deployment result data shown in Example 4 can be obtained.

In step 3, according to the deployment operation type corresponding to the to-be-deployed node and the to-be-deleted container in the deployed containers, a container on the server corresponding to the physical pool is deployed.

In some embodiments, when the deployment operation type is node adding, the component plugin corresponding to the node type of the to-be-deployed node is called, and a container corresponding to the to-be-deployed node is created on the server corresponding to the physical pool.

The correspondence between node types and component plugins is preset. Based on the node type of the to-be-deployed node, the corresponding component plugin can be determined, and a container can be created through the corresponding component plugin.

In some embodiments, in a case where the deployment operation type is node moving, the deployed container corresponding to the to-be-deployed node is deleted from the server where the container corresponding to the to-be-deployed node is already deployed, and the container corresponding to the to-be-deployed node is created in the server corresponding to the physical pool, and the data in the deployed container is copied to the created container.

It should be noted that since the data in each container is persisted to a storage device such as a hard disk, when the data in the deployed container is copied to the created container, the data in the deployed container can be obtained from the hard disk, such that the obtained data can be stored in the created container to achieve data copying.

In some embodiments, when the deployment operation type is node unchanging, there is no need to perform operations on the server corresponding to the physical pool.

In some embodiments, if there is a to-be-deleted container in the deployed containers, the to-be-deleted container is deleted from the server corresponding to the physical pool.

In some embodiments, the database associated with the computing device can further include a first deployment table and a second deployment table. The first deployment table can be configured to record each container deployment process, and the second deployment table can be configured to record the specific deployment content of each container deployment process.

That is to say, in some embodiments, after determining the deployment operation type corresponding to the to-be-deployed node and the to-be-deleted container in the deployed containers based on the first request message and the deployed containers on the server corresponding to the physical pool, the method of deploying a big data cluster provided by the present disclosure can further include the following process:

in response to the first request message, generating an operation record in a first deployment table, where the operation record is configured to record a current deployment operation; or in response to the first request message, generating a container deployment record corresponding to the to-be-deployed node in a second deployment table, where the container deployment record is configured to record a deployment operation corresponding to the to-be-deployed node.

The deployment status of the current operation can be recorded in the operation record, and the deployment status of the container corresponding to the to-be-deployed node can be recorded in the container deployment record. In some embodiments, the deployment status can include an undeployed status, a deployed status, a deployment error status, etc. The computing device can update the deployment status in container deployment record based on the deployment status of each container, and then update the deployment status in the operation record to a deployment completed status when each container is deployed.

In some embodiments, each node in the deployment resource pool can be displayed in different colors based on the deployment status recorded in the container deployment record, making it easy for users to view. Nodes in an undeployed state can be displayed in gray, nodes in a deployed state can be displayed in green, and nodes in a deployment error status can be displayed in red.

It should be noted that the computing device can query the deployment status of containers every preset period, to update the display pattern of each node in the deployment resource pool based on the queried deployment status. The preset period can be 10 seconds, and in some embodiments, the preset period can also be other periods. The present disclosure does not limit the value of the preset period.

In addition, a failure reason can further be recorded in the container deployment record, such that the relevant technical personnel can troubleshoot the problem.

The above embodiments mainly introduce the process of adding physical pools and deploying containers corresponding to nodes in the physical pool. In some embodiments, the deployment resource pool region can further be provided with a delete-physical-pool control, a set-top-physical-pool control, etc., to provide users with more diverse functions.

When the deployment resource pool region includes the delete-physical-pool control, the relevant technical personnel can delete the physical pool through the delete-physical-pool control.

In some embodiments, one physical pool corresponds to one delete-physical-pool control, and the relevant technical personnel can trigger a delete-physical-pool control corresponding to any physical pool. The computing device can respond to the trigger operation on any delete-physical-pool control and no longer display the physical pool corresponding to the triggered delete-physical-pool control in the deployment resource pool region.

Taking the deployment interface shown in FIG. 4 as an example, each physical pool displayed in the deployment resource pool region of the deployment interface has a "x" button in the upper right corner, which is configured as the delete-physical-pool control. Users can trigger any "x" button to delete the corresponding physical pool.

By setting the delete-physical-pool control in the deployment interface, users can delete any physical pool according to actual needs, to remove the server corresponding to the physical pool from the big data cluster, which can meet their technical needs. Moreover, the operation is simple, and users only need a simple operation of triggering the control to complete the modification of the big data cluster, greatly improving operational efficiency.

It should be noted that when a physical pool is deleted, the nodes displayed in the to-be-deleted physical pool need to be removed from the deployed nodes, to ensure that the physical pool is displayed as empty on the deployment interface, and then the physical pool can be deleted through the delete-physical-pool control. Additionally, it should be noted that the physical pool being initialized cannot be deleted.

In addition, it should be noted that when deleting a physical pool, the computing device can respond to the triggering operation on any delete-physical-pool control to delete the deployed container from the server corresponding to the physical pool corresponding to the delete-physical-pool control.

When any delete-physical-pool control is triggered, the computing device can query the deployed containers included in the server corresponding to the triggered delete-physical-pool control through the second deployment table, to call the Docker API to delete the interface of the deployed container from the corresponding server to complete the deletion of the deployed container.

In the case where the deployment resource pool region includes a set-top-physical-pool control, the relevant technical personnel can change the display position of the physical pool in the deployment resource pool through the set-top-physical-pool control.

In some embodiments, one physical pool corresponds to one set-top-physical-pool control, and the relevant technical personnel can trigger a set-top-physical-pool control corresponding to any physical pool. The computing device can respond to the triggering operation on any set-top-physical-pool control and display the physical pool corresponding to the set-top-physical-pool control at a first target location in the deployment resource pool region. The first target location can be the leftmost position in the deployment resource pool region.

Taking the deployment interface shown in FIG. 4 as an example, a "↑" button is provided in the upper right corner of each physical pool displayed in the deployment resource pool region of the deployment interface. This button is the set-top-physical-pool control, and users can change the display position of the corresponding physical pool by triggering any "↑" button.

It should be noted that when a certain number of physical pools are added to the deployment resource pool, it encounters certain difficulties when searching for physical pools. In the present disclosure, the functionality of the set-top physical pool is added, by triggering a set-top-physical-pool control corresponding to any physical pool, the physical pool can be moved to the leftmost position of the deployment resource pool, that is, the first position of the deployment resource pool, and the other physical pools are sequentially moved to the right, to make it more convenient for users to operate the node moved to the first position in physical pool, thereby improving the user experience.

In addition, in the present disclosure, a restore-setting control can further be provided in the deployment interface, such that when users encounter some problems while using the big data platform and want to restore the big data platform to the initial state for redeployment, the big data platform can be restored to the initial state through the restore-setting control.

In some embodiments, the computing device can generate a third request message in response to the triggering operation on the restore-setting control. The third request message is configured to request the deletion of deployed servers and containers. Based on the third request message, multiple deployed containers are deleted from the deployed server and a third preset script file is executed to remove the deployed server from the big data cluster.

In some embodiments, after the third request message is generated, the data format of the third request message can be verified. If the verification is successful, the third request message can be processed to ensure the legality and validity of the third request message, thereby ensuring the security of the processing process.

When multiple deployed containers are deleted from the deployed servers and the third preset script file is executed to remove the deployed servers from the big data cluster, through the second deployment table, all deployed containers in the big data cluster can be queried, and the container list is sequentially traversed. The Docker API is called through the deployed server IP and container name to delete the container interface and complete the deletion of all deployed containers. Moreover, through the first deployment table, all servers included in the big data cluster are queried, and the server list is sequentially traversed, and a script for leaving the Docker Swarm cluster is executed to complete the operation of detaching all servers from the cluster.

In some embodiments, since the operation of restoring factory settings is irreversible, the computing device can display prompt messages multiple times to confirm whether the user is sure to restore the factory settings after detecting the triggering operation on the restore-setting control. After the instruction to restore the factory settings is received, the third message data can be generated. The prompt information can be of various types such as text.

The processing logic after the above-mentioned restore-setting control is triggered can be seen in FIG. 13. FIG. 13 is a flowchart of a process for restoring factory settings according to an embodiment of the present disclosure. As shown in FIG. 13, after the user triggers the process of restoring factory settings, multiple text prompts can be configured to confirm whether the user is sure to perform the operation of restoring factory settings. After the user confirms, the backend of the computing device (i.e., the server) can perform verification based on the received request message, and if the verification passes, all containers are deleted by traversing all servers, and then all servers are detached from the big data cluster. In addition, all stored data in the big data cluster is deleted to restore the big data cluster to the initial state. Correspondingly, the deployment interface also restores to the system initial state.

The foregoing embodiments are mainly described around several commonly used big data components in the big data cluster. In some embodiments, in the present disclosure, the deployment of other types of containers can further be supported.

For example, the method provided in the present disclosure can further support deployment processes of containers such as Distributed Logging System (Kafka) components and Remote Dictionary Server (Redis) components. Below, taking the Redis component as an example, a deployment plan for the Redis cluster is provided.

Redis is an open-source, log-type, Key-Value database, written in ANSI C language, supports network, can be memory-based or persistent, and provides APIs in multiple languages. There is instability in a single Redis component. When a Redis service goes down, it can cause the service to be unavailable. Additionally, the read and write capabilities of a single Redis component are limited. Using a Redis cluster can enhance read and write capabilities of Redis, and when one server goes down, other servers can still work normally without affecting usage.

Therefore, developers can prepare the basic image files for deploying the Redis cluster in advance, and develop and deploy Redis plugins such that the deployment of the Redis cluster can be achieved through the methods provided by the present disclosure.

In some embodiments, the Redis component can be displayed in the deployment interface. Users can select Redis and trigger a create-node control. The computing device can respond to the user's triggering operation on the create-node control to display 6 Redis to-be-deployed nodes in the temporary resource pool region. Thereby, the Redis nodes are dragged and dropped to at least one physical pool of the deployment resource pool and a start-deployment control is triggered. The computing device can respond to the triggering operation on the start deployment-control, generate JSON request message data, and then verify the data format of the generated request message data, and verify whether the number of Redis to-be-deployed nodes is 6 (due to the nature of Redis components, the number of Redis to-be-deployed nodes need to be 6 before deployment is allowed). If the verification is successful, a Redis container is created on the corresponding server. The specific process can be seen in the above embodiments, and is not repeated here.

Figure 14:
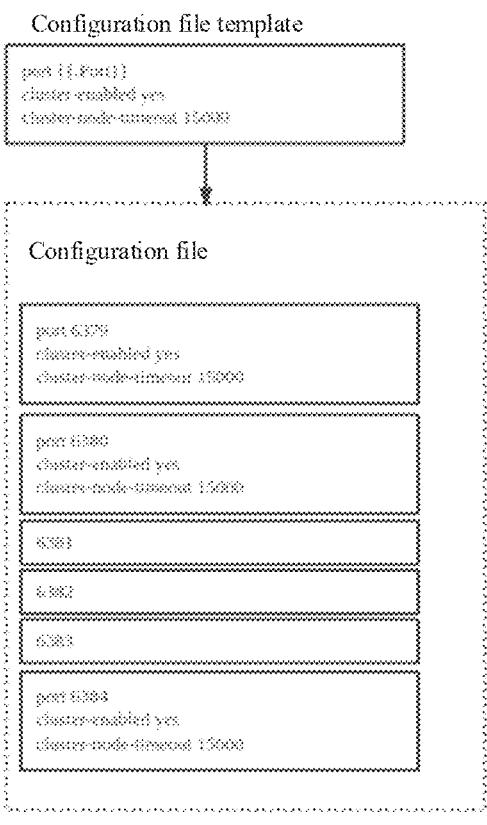
FIG. 14 is a schematic diagram of a "redis. conf" configuration file according to an embodiment of the present disclosure.

It should be noted that a "ridis.conf" configuration file can be generated for each Redis node based on the configuration file template. Referring to FIG. 14, a schematic diagram of a "redis. conf" configuration file according to an embodiment of the present disclosure, 6 redis nodes correspond to 6 "ridis.conf" configuration files, and the value range of {{. Port}} (i.e., the port numbers) in these six configuration files is 6379-6384. When the Redis cluster starts, each Redis node loads its corresponding configuration file.

In addition, it should be noted that after the cluster deployment is completed, the Redis cluster function can be used through the IP address of the server and the port number in any of the above configuration files.

The constructing process of the Redis cluster mentioned above can be seen in FIG. 15. FIG. 15 is a schematic diagram of a construction process of a Redis cluster according to an embodiment of the present disclosure. As shown in FIG. 15, developers can pre-develop Redis plugins, that is, build a Redis basic image, and then abstract the configuration file, to develop plugin functions (including reading parameter items, creating configuration files, copying configuration files to remote target machines, starting containers on target machines, etc.), compile, install, and load plugins, such that Redis containers can be deployed through the loaded Redis plugins. For example, a node is first deployed, the deployed Redis node is dragged and dropped to the deployment resource pool, and then the start deployment operation is triggered. If the deployment rule is met, the server processes according to the deployment logic and calls the Redis plugin to pass parameters to achieve Redis construction; otherwise, an error message is returned for re-deployment of the Redis node.

The process shown in FIG. 15 is only a procedural explanation, and the specific implementation process can be seen in the various embodiments mentioned above, and is not repeated here.

The above process mainly introduces some content about the process of building a big data cluster. After a big data cluster is built and corresponding containers are deployed in the big data cluster, services can be provided to users through the built big data cluster. Different containers of the big data cluster communicate through the Overlay network to jointly provide services to users.

Referring to FIG. 16, a flowchart of a big data cluster based data processing method according to an embodiment of the present disclosure, the method can include following steps 1601-1602.

In step 1601, a data processing request is obtained.

In step 1602, through the Overlay network, the data processing request is sent to a target container. The target container is configured to implement the data processing process based on the data processing request. A container is created on a server according to the drag-and-drop operation on the to-be-deployed node in the deployment interface, and the container is configured to provide big data cluster services.

Through the Overlay network, communication between various containers in the big data cluster is ensured. Therefore, when a data processing request is obtained, the data processing request can be sent to the target container through the Overlay network, such that the target container can implement the data processing process based on the data processing request to meet the data processing needs of users.

In some embodiments, for the step 1602, when the data processing request is sent to the target container through the Overlay network, at least one target container can be determined based on the data processing request, thereby the data processing request is sent to the at least one target container through the Overlay network.

It should be noted that when the number of target containers is greater than or equal to 2, the at least one target container includes a first target container and a second target container. When the data processing request is sent to the at least one target container through the Overlay network, the data processing request can be sent to the first target container through the Overlay network. The first target container is configured to communicate with the second target container through the Overlay network to complete the response to the data processing request.

Taking the process of achieving data communication requirements between the first target container and the second target container through the Overlay network as an example, the first target container can encapsulate the to-be-transmitted data to obtain a first data message, and then encapsulate the first data message to obtain a second data message. The destination IP address of the first data message is the IP address of the second target container, and the source IP address of the first data message is the IP address of the first target container. The destination IP address of the second data message is the IP address of the server where the second target container is located, and the source IP address of the second data message is the IP address of the server where the first target container is located. The first target container can then send the second data message to the second target container through the Overlay network, such that the second target container can disassemble the double layer packaging of the second data message to obtain the data part that truly needs to be processed.

The data processing request can be a data storing request, a data obtaining request, or a data deleting request. In some embodiments, the data processing request may further include other types of requests, and the present disclosure does not limit the types of data processing requests.

In embodiments of the present disclosure, a big data cluster deployment system and a corresponding data processing system are further provided, which can include at least a visualization operation module and a service constructing module. The visualization operation module is configured to provide users with a convenient operation interface for deploying a big data cluster, where servers can be added and removed, nodes included in big data components can be deployed, moved, and deleted, and a cluster can be restored to factory settings, etc. The service constructing module can be configured to provide API interface services, data rule verification, component deployment logic processing, message processing, plugin calls, database persistence and other functions.

In some embodiments, the system can further include a message module, a database module, a network module, and a big data component plugin module. The message module is a RabbitMQ based message queue that completes message production and consumption when called by an architecture deployment module, which improves user experience and ensure data consistency, stability, and reliability, in time-consuming scenarios such as server initialization and deployment of various component containers. The database module uses a MYSQL database to store server status, component deployment status, and relationship information between component deployments and servers. The network module is a Docker based overlay network, which is used when the big data service container starts, ensuring cross-server communication between containers. The big data component plugin module is configured to develop a pluggable start plugin for each big data component, and the plugin is stated by combining the server IP with a plugin parameter to complete the startup of a designated component container on a designated server.

The above is only a brief description of the function of each module, and the following is a detailed introduction to the functions of each module.

The visualization operation module is configured to display the deployment interface.

The visualization operation module is further configured to, in response to a node creation operation in the deployment interface, display a to-be-deployed node in a temporary resource pool region in the deployment interface, where a node is a service included in a big data component to provide a data management function.

The visualization operation module is further configured to, in response to the drag-and-drop operation on the to-be-deployed node in the region of the temporary resource pool, display the to-be-deployed node in the physical pool in the region of the deployment resource pool in the deployment interface.

The service constructing module is configured to, in response to a start deployment operation in the deployment interface, according to the physical pool where the to-be-deployed node is located, create a container corresponding to the to-be-deployed node on the server corresponding to the physical pool. The container is configured to provide big data cluster services.

In some embodiments, the deployment interface includes a node creation region, where the node creation region includes a create-node control and at least one big data component.

The visualization operation module, when in response to the node creation operation in the deployment interface, displaying the to-be-deployed node in the temporary resource pool region in the deployment interface, is configured to:

when any big data component is selected, in response to the triggering operation on the create-node control, display a to-be-deployed node corresponding to the selected big data component in the temporary resource pool region.

In some embodiments, the node creation region further includes a set-node-parameter control. The set-node-parameter control is configured to set the version of the to-be-deployed node.

The visualization operation module, when in response to the triggering operation on the create-node control, displaying a to-be-deployed node corresponding to the selected big data component in the temporary resource pool region, is configured to:

in response to the triggering operation on the create-node control, display the to-be-deployed node corresponding to a version set by the set-node-parameter control in the temporary resource pool region.

In some embodiments, the big data components include an HDFS component, a YARN component, a Hive component, or a Clickhouse component.

In some embodiments, the deployment resource pool region includes at least one physical pool.

The visualization operation module, when in response to the drag-and-drop operation on the to-be-deployed node in the region of the temporary resource pool, displaying the to-be-deployed node in the physical pool in the region of the deployment resource pool in the deployment interface, is configured to:

for any to-be-deployed node, in response to the drag-and-drop operation on the to-be-deployed node, display the to-be-deployed node in the physical pool indicated at an end of the drag-and-drop operation.

In some embodiments, the service constructing module, when in response to the start deployment operation in the deployment interface, deploying the container corresponding to the to-be-deployed node on the server corresponding to the physical pool in which the to-be-deployed node is located, is configured to:

in response to the start deployment operation, based on a component type of the big data component to which the to-be-deployed node belongs, determine a target plugin;

through the target plugin, start a target interface on the server corresponding to the physical pool; and through the target interface, deploy the container corresponding to the to-be-deployed node on the server corresponding to the physical pool.

In some embodiments, the service constructing module, when through the target interface, deploying a container corresponding to the to-be-deployed node on the server corresponding to the physical pool, is configured to:

through the target plugin, obtain a target installation environment from a first configuration file by reading the first configuration file; and through the target interface, modify a configuration file of the target installation environment of the server, to deploy the container corresponding to the to-be-deployed node on the server corresponding to the physical pool.

In some embodiments, the target plugin is a binary package, and the target plugin is stored at a set location in the big data cluster.

The process of determining the target plugin includes:

obtaining the target plugin uploaded to an initial server of the big data cluster; and storing the target plugin at the set location in the big data cluster.

In some embodiments, the service constructing module, when in response to the start deployment operation in the deployment interface, deploying the container corresponding to the to-be-deployed node on the server corresponding to the physical pool in which the to-be-deployed node is located, is configured to:

in response to the start deployment operation, based on the to-be-deployed node and the physical pool in which the to-be-deployed node is located, generate a first request message, where the first request message is configured to indicate a deployment of the container corresponding to the to-be-deployed node on the server corresponding to the physical pool;

based on the first request message and at least one deployed container on the server corresponding to the physical pool, determine a deployment operation type corresponding to the to-be-deployed node and a to-be-deleted container in the at least one deployed container, where the deployment operation type includes node adding, node moving, or node unchanging; and according to the deployment operation type corresponding to the to-be-deployed node and the to-be-deleted container in the deployed containers, deploy a container on the server corresponding to the physical pool.

In some embodiments, the service constructing module is further configured to store the first request message in the first message queue.

The system further includes:

a message module, configured to obtain the first request message from the first message queue.

The service constructing module is further configured to, in response to determining that the message module obtains the first request message, based on the first request message and the at least one deployed container on the server corresponding to the physical pool, determine a deployment operation type corresponding to the to-be-deployed node and the to-be-deleted container in the at least one deployed container.

In some embodiments, the service constructing module, when according to the deployment operation type corresponding to the to-be-deployed node and the to-be-deleted container in the deployed containers, deploying a container on the server corresponding to the physical pool, is configured to:

in response to determining that the deployment operation type is node adding, call the component plugin corresponding to the node type of the to-be-deployed node, and create a container corresponding to the to-be-deployed node on the server corresponding to the physical pool;

in response to determining that the deployment operation type is node moving, delete the deployed container corresponding to the to-be-deployed node from the server where the container corresponding to the to-be-deployed node is already deployed, and create the container corresponding to the to-be-deployed node on the server corresponding to the physical pool, and copy the data in the deployed container to the created container;

in response to determining that the deployment operation type is node unchanging, perform no operation on the server corresponding to the physical pool; and in response to determining that there is a to-be-deleted container in the at least one deployed container, delete the to-be-deleted container from the server corresponding to the physical pool.

In some embodiments, the service constructing module is further configured to verify the data format of the first request message.

The service constructing module is further configured to, according to a preset deployment rule, verify deployment data carried by the first request message.

In some embodiments, the system further includes a database module.

The database module is configured to, in response to the first request message, generate an operation record in a first deployment table, where the operation record is configured to record a current deployment operation.

The database module is further configured to in response to the first request message, generate a container deployment record corresponding to the to-be-deployed node in a second deployment table, where the container deployment record is configured to record a deployment operation corresponding to the to-be-deployed node.

In some embodiments, the database module is further configured to record the deployment status of the current operation in the operation record.

The database module is further configured to record the deployment status of the container corresponding to the to-be-deployed node in the container deployment record.

The deployment status includes an undeployed status, a deployed status or a deployment error status.

In some embodiments, there are multiple types of the to-be-deployed nodes.

The visualization operation module is further configured to display the deployment instruction interface.

The visualization operation module is further configured to obtain target data filled in by users through the deployment instruction interface, where the target data is configured to indicate the number of data pieces stored per second by the to-be-deployed container.

The service constructing module is further configured to, based on the target data and a preset parameter, determine the recommended deployment number of each type of to-be-deployed node.

In some embodiments, the deployment resource pool region includes an add-new-physical-pool control. The visualization operation module is further configured to:

in response to the triggering operation on the add-new-physical-pool control, display an interface for adding a physical pool, where the interface for adding a physical pool includes the obtain-identification control and the obtain-password control;

through the obtain-identification control, obtain the server ID corresponding to the to-be-added physical pool, and through the obtain-password control, obtain the to-be-verified password; and in response to determining that the to-be-verified password is verified, display the to-be-added physical pool in the deployment resource pool region.

In some embodiments, the service constructing module is further configured to generate a second request message when the to-be-verified password has passed.

The service constructing module is further configured to store the second request message in the second message queue.

The system further includes:

a message module, configured to obtain the second request message from the second message queue.

The service constructing module is further configured to, based on the second request message, send an installation file to the server corresponding to the to-be-added physical pool. The server is configured to install the installation file upon receiving the installation file, such that the server can join the big data cluster.

In some embodiments, the visualization operation module is further configured to, in response to determining that the to-be-verified password does not pass or the server is not successfully to be added to the big data cluster, display a first prompt message, where the first prompt message is configured to indicate a reason why the server is not successfully to be added to the big data cluster.

In some embodiments, the system further includes:

a database module, configured to, in response to determining that the to-be-verified password is verified, generate a server deployment record in a third deployment table, where the server deployment record is configured to record a deployment operation corresponding to the to-be-added physical pool.

In some embodiments, the database module is further configured to record an initialization status of the server corresponding to the to-be-added physical pool in the server deployment record. The initialization status can include a to-be-initialized status, an initializing status, an initialization error status, and an initialization completed status.

In some embodiments, the deployment resource pool region includes a delete-physical-pool control. One physical pool corresponds to one delete-physical-pool control.

The visualization operation module is further configured to, in response to a triggering operation on any delete-physical-pool control, no longer display the physical pool corresponding to the delete-physical-pool control in the deployment resource pool region.

In some embodiments, the service constructing module is further configured to, in response to a triggering operation on any delete-physical-pool control, delete the deployed container from the server corresponding to the physical pool corresponding to the delete-physical-pool control.

In some embodiments, the deployment resource pool region includes a set-top-physical-pool control. One physical pool corresponds to one set-top-physical-pool control.

The visualization operation module is further configured to, in response to a triggering operation on any set-top-physical-pool control, display the physical pool corresponding to the set-top-physical-pool control at a first target location in the deployment resource pool region.

In some embodiments, the visualization operation module is further configured to, for any physical pool displayed in the deployment resource pool region, display identification of the server corresponding to the physical pool at a second target location of the physical pool, and display current storage usage, memory usage, and allocated memory usage of the server corresponding to the physical pool at a third target location of the physical pool.

In some embodiments, the deployment interface further includes a restore-setting control.

The service constructing module is further configured to, in response to a triggering operation on a restore-setting control, generate a third request message. The third request message is configured to request the deletion of deployed servers and containers.

The service constructing module is further configured to, based on the third request message, delete multiple deployed containers from deployed servers and execute a third preset script file to detach the deployed servers from the big data cluster.

In some embodiments, the big data cluster includes at least one server, the at least one server includes an initial server, and the service constructing module is further configured to:

install a target runtime environment on the initial server, and configure an interface corresponding to the target runtime environment on the initial server;

create an Overlay network corresponding to the target runtime environment on the initial server, and initialize a cluster environment on the initial server;

create a basic image of a big data component on the initial server, where the basic image of the big data component is configured to provide a foundation for constructing a container; and generate a target key file on the initial server.

In some embodiments, the system further includes a network module to ensure cross-server communication between containers.

In some embodiment, the network module is configured to, after obtaining a data processing request, through the Overlay network, send the data processing request to a target container, where the target container is configured to implement data processing based on the data processing request, and a container is created on a server according to a drag-and-drop operation on a to-be-deployed node in a deployment interface and is configured to provide a big data cluster service.

In some embodiments, the network module, when through the Overlay network, sending the data processing request to a target container, is configured to:

based on the data processing request, determine at least one target container; and through the Overlay network, sending the data processing request to the at least one target container.

In some embodiments, in a case where the number of the at least one target container is greater than or equal to 2, the at least one target container includes a first target container and a second target container.

The network module, when through the Overlay network, sending the data processing request to the at least one target container, is configured to:

through the Overlay network, send the data processing request to the first target container, where the first target container is configured to communicate with the second target container through the Overlay network to complete a response to the data processing request.

In some embodiments, the data processing request includes a data storing request, a data obtaining request, or a data deleting request.

In some embodiments, the system further includes a big data component plugin module, where the big data component plugin module is configured to start a container on the server.

Since the system embodiments basically correspond to the method embodiments, the relevant parts can refer to the partial description of the method embodiments. The system embodiments described above are only schematic, where the modules described as separate components can be or cannot be physically separated, and the components shown as modules can be or cannot be physical modules, that is, they can be located in one place, or they can be distributed to multiple physical modules. Some or all of the modules can be selected according to the actual needs to achieve the purpose of the technical solutions of the present disclosure. A person skilled in the art can understand and implement without creative work.

Below, taking several actual processing processes as examples, the system provided in the present disclosure is further described.

Figure 17:
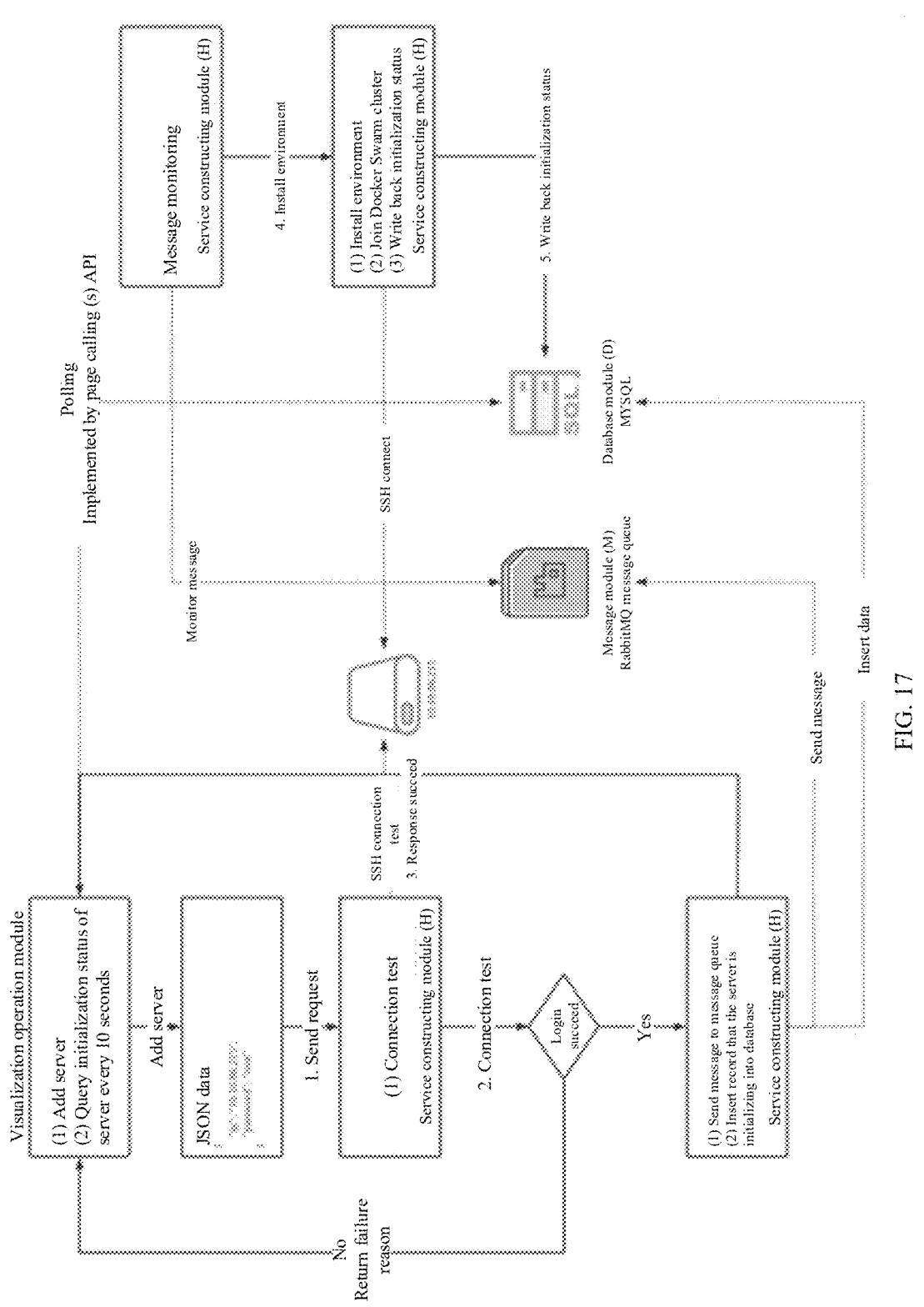
FIG. 17 is a flowchart of a module interaction process according to an embodiment of the present disclosure.

For example, referring to FIG. 17, a flowchart of a module interaction process according to an embodiment of the present disclosure, taking the interaction process between various modules when a physical pool is added as an example, the visualization operation module is configured to add a server to a big data cluster and query an initialization status of the server every 10 seconds. When a server is added to a big data cluster through the visualization operation module, a request message in the JSON format can be generated through the visualization operation module, and the request message is sent to the service constructing module. After receiving the request message, the service constructing module, through SSH connection testing, remotely logs in to the server, when the login is successful, sends a message to a message queue in the message module, and inserts a record that the server is in an initializing status into the database module. In addition, the architecture server module can further monitor the message module to obtain messages from the message queue of the message module, and based on the obtained messages, perform environment installation on the server, to enable the server to join the Docker Swarm cluster, and update the initialization status of the server recorded in the database module.

Figure 18:
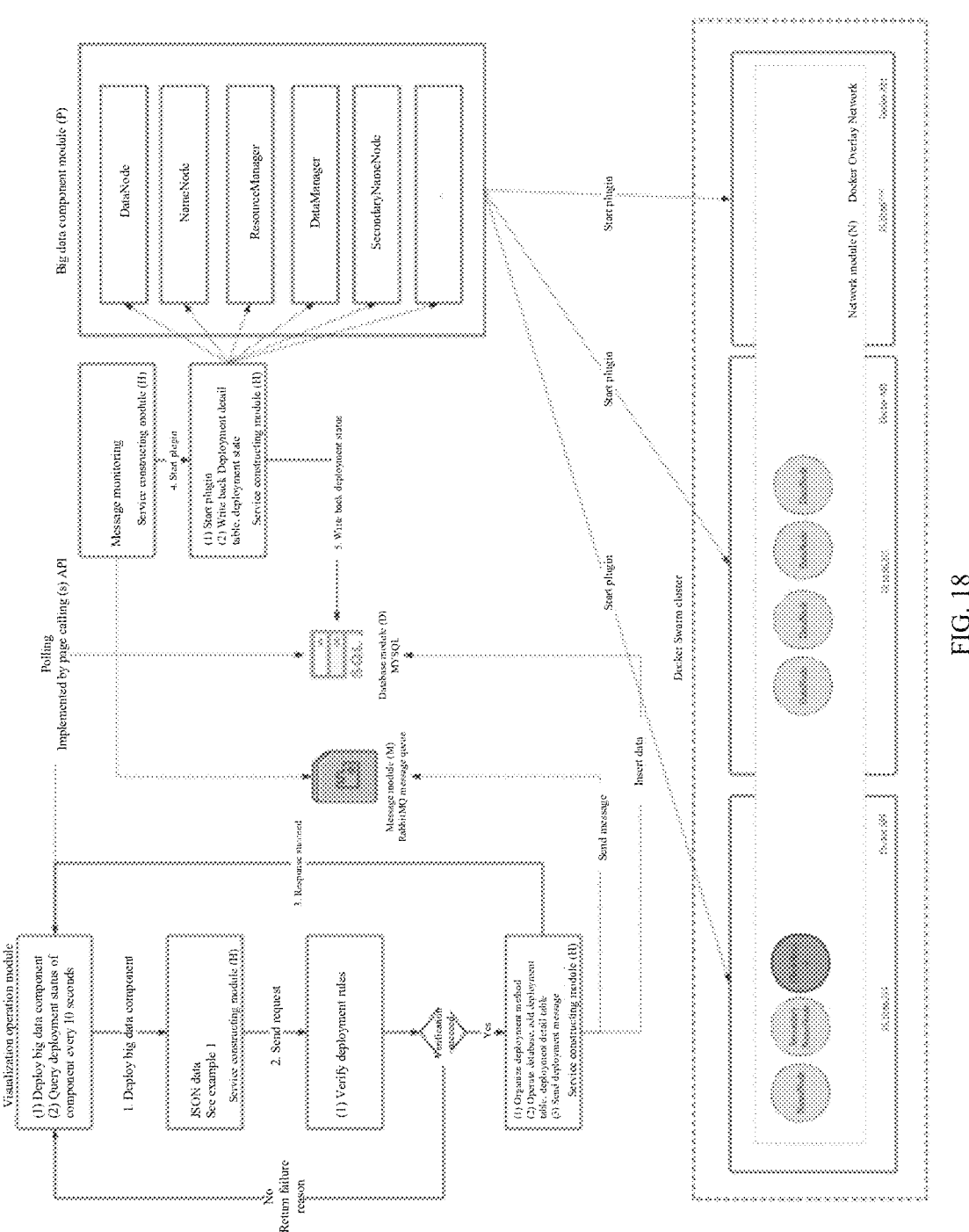
FIG. 18 is a flowchart of a module interaction process according to an embodiment of the present disclosure.

For example, referring to FIG. 18, a flowchart of a module interaction process according to an embodiment of the present disclosure, taking the interaction process between various modules when a container is deployed as an example, the visualization operation module is configured to deploy a container corresponding to a big data component and query a deployment status of the container every 10 seconds. When the container corresponding to the big data component is deployed through the visualization operation module, a request message in the JSON format can be generated through the visualization operation module, and the request message is sent to the service constructing module. Upon receiving the request message, the service constructing module verifies the request message based on a deployment rule, and if the verification is successful, determines the deployment manner (i.e., node deployment operation type), and sends a message to a message queue in the message module, and adds a first deployment table (i.e. the deployment table shown in FIG. 18) and a second deployment table (i.e. the deployment detail table shown in FIG. 18) in the database module to record. In addition, the service constructing module can further monitor the message module to obtain messages from the message queue of the message module, start a plugin on the server based on the obtained messages, and update the deployment status recorded in the database module.

Figure 19:
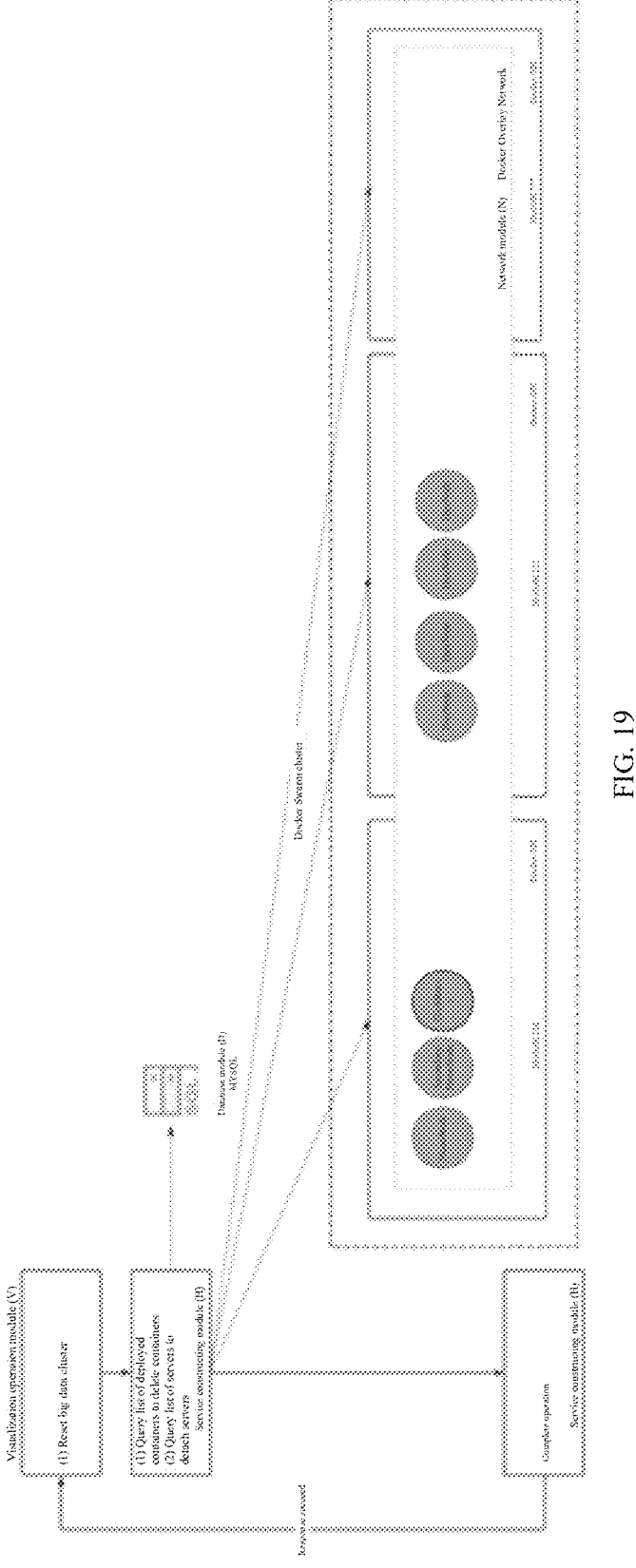
FIG. 19 is a flowchart of a module interaction process according to an embodiment of the present disclosure.

For example, referring to FIG. 19, a flowchart of a module interaction process according to an embodiment of the present disclosure, taking the interaction process between various modules when restoring factory settings as an example, the visualization operation module is configured to reset the big data cluster. When there is a need to reset the big data cluster, the visualization operation module can, according to the content recorded in the database module, query the list of deployed containers to delete all deployed containers, and further query the list of servers to detach all servers from the big data cluster, to complete the reset of the big data cluster.

The above are only three exemplary explanations and do not constitute a limitation of the present disclosure.

Figure 20:
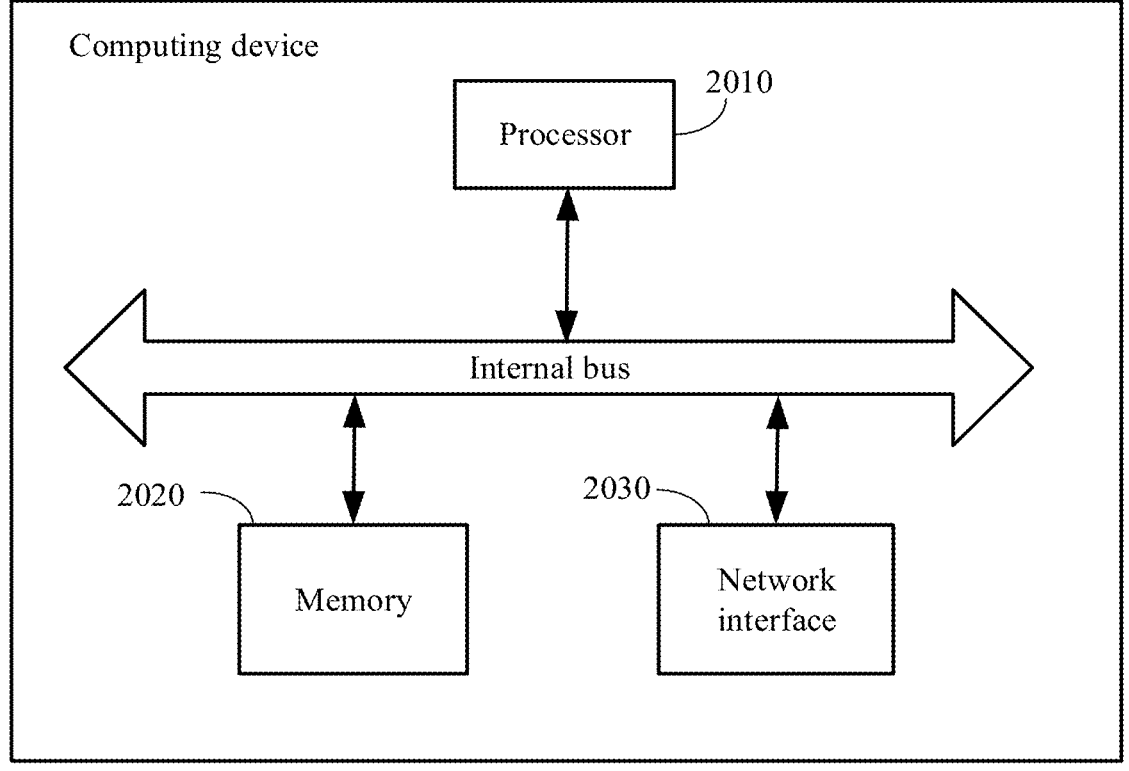
FIG. 20 is a schematic structural diagram of a computing device according to an embodiment of the present disclosure.

In the present disclosure, a computing device is further provided, as shown in FIG. 20, a schematic structural diagram of a computing device according to an embodiment of the present disclosure. As shown in FIG. 20, the computing device includes a processor 2010, a memory 2020, and a network interface 2030. The memory 2020 is configured to store computer instructions that can be run on the processor 2010, the processor 2010 is configured to, when executing the computer instructions, implement the data processing method (including the method of deploying a big data cluster and the big data cluster based data processing method) provided by any embodiment of the present disclosure. The network interface 2030 is configured to implement input and output functions. In some embodiments, the computing device may further include other hardware, which is not limited in the present disclosure.

In the present disclosure, a computer-readable storage medium is further provided, which can be in various forms. For example, in different examples, the computer-readable storage medium can be a Random Access Memory (RAM), a volatile memory, a non-volatile memory, a flash memory, a storage drive (e.g., hard disk drive), a solid state hard disk, any type of storage disk (e.g., compact disk, Digital Video Disk (DVD)), or a similar storage medium, or a combination thereof. In some embodiments, the computer-readable storage medium can further be a paper or other suitable media that can print programs. A computer program is stored on the computer-readable storage medium, and the computer program when executed by a processor achieves the method provided in any embodiment of the present disclosure.

In the present disclosure, a computer program product is further provided, where the computer program product includes a computer program, and the computer program when executed by a processor achieves the method provided in any embodiment of the present disclosure.

In the present disclosure, the terms "first" and "second" are only for descriptive purposes, and cannot be understood as indicating or implying relative importance. The term "multiple" means two or more, unless otherwise clearly defined.

After considering and practicing the disclosure of the specification, other embodiments of the present disclosure will be readily apparent to those skilled in the art. The present disclosure is intended to cover any modification, use or adaptation of the present disclosure. These modifications, uses or adaptations follow the general principles of the present disclosure and include common knowledge and conventional technical means in the technical field that are not disclosed in the present disclosure. The specification and embodiments herein are intended to be illustrative only and the real scope and spirit of the present disclosure are indicated by the claims of the present disclosure.

It is to be understood that the present disclosure is not limited to the precise structures described above and shown in the accompanying drawings and may be modified or changed without departing from the scope of the present disclosure. The scope of protection of the present disclosure is limited only by the appended claims.

The invention claimed is:

1. A method of deploying a big data cluster, comprising:
displaying a deployment interface;
in response to a node creation operation in the deployment interface, displaying a to-be-deployed node in a temporary resource pool region in the deployment interface, wherein a node is a service comprised in a big data component to provide a data management function;
in response to a drag-and-drop operation on the to-be-deployed node in the temporary resource pool region, displaying the to-be-deployed node in a physical pool in a deployment resource pool region in the deployment interface; and
in response to a start deployment operation in the deployment interface, according to the physical pool where the to-be-deployed node is located, creating a container corresponding to the to-be-deployed node on a server corresponding to the physical pool, wherein the container is configured to provide a big data cluster service;
wherein the deployment interface comprises a node creation region, the node creation region comprises a create-node control and at least one big data component, wherein the at least one big data component comprises a Hadoop Distributed File System (HDFS) component, a Yet Another Resource Negotiator (YARN) component, a Hive component or a Clickhouse component, and
in response to the node creation operation in the deployment interface, displaying the to-be-deployed node in the temporary resource pool region in the deployment interface comprises:
in a case that one of the at least one big data component is selected, in response to a triggering operation on the create-node control, displaying a to-be-deployed node corresponding to the selected big data component in the temporary resource pool region;
wherein in response to the start deployment operation in the deployment interface, according to the physical pool where the to-be-deployed node is located, deploying the container corresponding to the to-be-deployed node on the server corresponding to the physical pool comprises:

based on the to-be-deployed node and the physical pool in which the to-be-deployed node is located, generating a first request message, wherein the first request message is configured to indicate a deployment of the container corresponding to the to-be-deployed node on the server corresponding to the physical pool;

based on the first request message and at least one deployed container on the server corresponding to the physical pool, determining a deployment operation type corresponding to the to-be-deployed node and a to-be-deleted container in the at least one deployed container, wherein the deployment operation type comprises node adding, node moving, or node unchanging; and according to the deployment operation type corresponding to the to-be-deployed node and the to-be-deleted container in the at least one deployed container, performing a container deployment on the server corresponding to the physical pool.

2. The method according to claim 1, wherein the node creation region further comprises a set-node-parameter control, the set-node-parameter control is configured to set a version of the to-be-deployed node, and in response to the triggering operation on the create-node control, displaying the to-be-deployed node corresponding to the selected big data component in the temporary resource pool region comprises:

in response to the triggering operation on the create-node control, displaying the to-be-deployed node corresponding to a version set by the set-node-parameter control in the temporary resource pool region.

3. The method according to claim 1, wherein the deployment resource pool region comprises at least one physical pool, and in response to the drag-and-drop operation on the to-be-deployed node in the temporary resource pool region, displaying the to-be-deployed node in the physical pool in the deployment resource pool region in the deployment interface comprises:

for any to-be-deployed node, in response to the drag-and-drop operation on the to-be-deployed node, displaying the to-be-deployed node in the physical pool indicated at an end of the drag-and-drop operation.

4. The method according to claim 1, wherein in response to the start deployment operation in the deployment interface, according to the physical pool where the to-be-deployed node is located, deploying the container corresponding to the to-be-deployed node on the server corresponding to the physical pool comprises:

in response to the start deployment operation, based on a component type of the big data component to which the to-be-deployed node belongs, determining a target plugin;

through the target plugin, starting a target interface on the server corresponding to the physical pool; and through the target interface, deploying the container corresponding to the to-be-deployed node on the server corresponding to the physical pool.

5. The method according to claim 4, wherein through the target interface, deploying the container corresponding to the to-be-deployed node on the server corresponding to the physical pool comprises: through the target plugin, obtaining a target installation environment from a first configuration file by reading the first configuration file; and through the target interface, deploying the container corresponding to the to-bedeployed node on the server corresponding to the physical pool by modifying a configuration file of the target installation environment of the server; or the target plugin comprises a binary package, the target plugin is stored at a set location in the big data cluster, and determining the target plugin comprises: obtaining the target plugin uploaded to an initial server of the big data cluster; and storing the target plugin at the set location in the big data cluster.

6. The method according to claim 1, wherein after in response to the start deployment operation, based on the to-be-deployed node and the physical pool in which the to-be-deployed node is located, generating the first request message, the method further comprises: storing the first request message in a first message queue; and obtaining the first request message from the first message queue; and based on the first request message and the at least one deployed container on the server corresponding to the physical pool, determining the deployment operation type corresponding to the to-be-deployed node and the to-be-deleted container in the at least one deployed container; or according to the deployment operation type corresponding to the to-be-deployed node and the to-be-deleted container in the at least one deployed container, performing the container deployment on the server corresponding to the physical pool comprises: in response to determining that the deployment operation type is node adding, calling a component plugin corresponding to a node type of the to-be-deployed node, and creating a container corresponding to the to-be-deployed node on the server corresponding to the physical pool; in response to determining that the deployment operation type is node moving, deleting a deployed container corresponding to the to-be-deployed node from a server where the container corresponding to the to-be-deployed node is deployed, creating a container corresponding to the to-be-deployed node on the server corresponding to the physical pool, and copying data of the deleted container to the created container; in response to determining that the deployment operation type is node unchanging, performing no operation on the server corresponding to the physical pool; and in response to determining that there is a to-be-deleted container in the at least one deployed container, deleting the to-be-deleted container from the server corresponding to the physical pool; or after in response to the start deployment operation, based on the to-be-deployed node and the physical pool in which the to-be-deployed node is located, generating the first request message, the method further comprises at least one of: verifying a data format of the first request message; or according to a preset deployment rule, verifying deployment data carried by the first request message; or the method further comprises at least one of: in response to the first request message, generating an operation record in a first deployment table, wherein the operation record is configured to record a current deployment operation; or in response to the first request message, generating a container deployment record corresponding to the to-be-deployed node in a second deployment table, wherein the container deployment record is configured to record a deployment operation corresponding to the to-be-deployed node; and the method further comprises at least one of: recording a deployment status for a current operation in the operation record; or recording a deployment status for a container corresponding to the to-be-deployed node in the container deployment record; wherein the deployment status comprises an undeployed status, a deployed status or a deployment error status.

7. The method according to claim 1, wherein there are multiple types of the to-be-deployed nodes, and the method further comprises:

displaying a deployment instruction interface;

obtaining a component version and a type of a to-be-deployed big data component, and target data through the deployment instruction interface, wherein the target data is configured to indicate a number of data pieces stored per second required for data processing needs; and based on the component version and the type of the to-be-deployed big data component, the target data and a preset parameter, determining a recommended deployment number of each of the multiple types of the to-be-deployed nodes.

8. The method according to claim 1, wherein the deployment resource pool region comprises an add-new-physical-pool control, and the method further comprises:

in response to a triggering operation on the add-new-physical-pool control, displaying an adding physical pool interface, wherein the adding physical pool interface comprises an obtain-identification control and a obtain-password control;

through the obtain-identification control, obtaining a server identification corresponding to a to-be-added physical pool, and through the obtain-password control, obtaining a to-be-verified password; and in response to determining that the to-be-verified password is verified, displaying the to-be-added physical pool in the deployment resource pool region.

9. The method according to claim 8, wherein after through the obtain-identification control, obtaining the server identification corresponding to the to-be-added physical pool, and through the obtain-password control, obtaining the to-be-verified password, the method further comprises: in response to determining that the to-be-verified password is verified, generating a second request message; storing the second request message in a second message queue; and obtaining the second request message from the second message queue, based on the second request message, send an installation file to a server corresponding to the to-be-added physical pool, wherein the server is configured to install the installation file upon receiving the installation file, to enable the server to be added to the big data cluster; or in response to determining that the to-be-verified password does not pass or the server is not successfully to be added to the big data cluster, displaying a first prompt message, wherein the first prompt message is configured to indicate a reason why the server is not successfully to be added to the big data cluster; or the method further comprises: in response to determining that the to-be-verified password is verified, generating a server deployment record in a third deployment table, wherein the server deployment record is configured to record a deployment operation corresponding to the to-be-added physical pool; and recording an initialization status of the server corresponding to the to-be-added physical pool in the server deployment record, wherein the initialization status comprises a to-beinitialized status, an initializing status, an initialization error status, or an initialization completed status; or in response to determining that the to-be-verified password is verified, sending a target key to the server corresponding to the to-be-added physical pool, wherein the target key is configured for identity verification in a communication process.

10. The method according to claim 1, wherein the deployment resource pool region comprises a delete-physical-pool control, one physical pool corresponds to one delete-physical-pool control, and the method further comprises:

in response to a triggering operation on any delete-physical-pool control, no longer displaying a physical pool corresponding to the delete-physical-pool control in the deployment resource pool region; and deleting a deployed container from a server corresponding to a physical pool corresponding to the delete-physical-pool control.

11. The method according to claim 1, wherein the deployment resource pool region comprises a set-top-physical-pool control, one physical pool corresponds to one set-top-physical-pool control, and the method further comprises: in response to a triggering operation on any set-top-physical-pool control, displaying a physical pool corresponding to the set-top-physical-pool control at a first target location in the deployment resource pool region; or the method further comprises: for any physical pool displayed in the deployment resource pool region, displaying a server identification of the server corresponding to the physical pool at a second target location of the physical pool, and displaying current storage usage, memory usage, and allocated memory usage of the server corresponding to the physical pool at a third target location of the physical pool.

12. The method according to claim 1, wherein the deployment interface further comprises a restore-setting control, and the method further comprises:

in response to a triggering operation on the restore-setting control, generating a third request message, wherein the third request message is configured to request deletion of a deployed server and a deployed container; and based on the third request message, deleting the deployed container from the deployed server, and executing a third preset script file to detach the deployed server from the big data cluster.

13. The method according to claim 1, wherein the big data cluster comprises at least one server, the at least one server comprises an initial server, and the method comprises:

installing a target runtime environment on the initial server, and configuring an interface corresponding to the target runtime environment on the initial server;

creating an Overlay network corresponding to the target runtime environment on the initial server, and initializing a cluster environment on the initial server;

creating a basic image of a big data component on the initial server, wherein the basic image of the big data component is configured to provide a foundation for constructing a container; and generating a target key file on the initial server.

14. A big data cluster based data processing method, comprising:

obtaining a data processing request;

through an Overlay network, sending the data processing request to a container, wherein the container is configured to implement data processing based on the data processing request, the container is configured to provide a big data cluster service, and the big data cluster service is deployed by:

displaying a deployment interface;

in response to a node creation operation in the deployment interface, displaying a to-be-deployed node in a temporary resource pool region in the deployment interface, wherein a node is a service comprised in a big data component to provide a data management function;

in response to a drag-and-drop operation on the to-be-deployed node in the temporary resource pool region, displaying the to-be-deployed node in a physical pool in a deployment resource pool region in the deployment interface; and in response to a start deployment operation in the deployment interface, according to the physical pool where the to-be-deployed node is located, creating a container corresponding to the to-be-deployed node on a server corresponding to the physical pool, wherein the container is configured to provide a big data cluster service;

wherein the deployment interface comprises a node creation region, the node creation region comprises a create-node control and at least one big data component, wherein the at least one big data component comprises a Hadoop Distributed File System (HDFS) component, a Yet Another Resource Negotiator (YARN) component, a Hive component or a Clickhouse component, and in response to the node creation operation in the deployment interface, displaying the to-be-deployed node in the temporary resource pool region in the deployment interface comprises:

in a case that one of the at least one big data component is selected, in response to a triggering operation on the create-node control, displaying a to-be-deployed node corresponding to the selected big data component in the temporary resource pool region;

wherein in response to the start deployment operation in the deployment interface, according to the physical pool where the to-be-deployed node is located, deploying the container corresponding to the to-be-deployed node on the server corresponding to the physical pool comprises:

based on the to-be-deployed node and the physical pool in which the to-be-deployed node is located, generating a first request message, wherein the first request message is configured to indicate a deployment of the container corresponding to the to-be-deployed node on the server corresponding to the physical pool;

based on the first request message and at least one deployed container on the server corresponding to the physical pool, determining a deployment operation type corresponding to the to-be-deployed node and a to-be-deleted container in the at least one deployed container, wherein the deployment operation type comprises node adding, node moving, or node unchanging; and according to the deployment operation type corresponding to the to-be-deployed node and the to-be-deleted container in the at least one deployed container, performing a container deployment on the server corresponding to the physical pool.

15. The method according to claim 14, wherein through the Overlay network, sending the data processing request to the target container comprises:

based on the data processing request, determining at least one target container; and through the Overlay network, sending the data processing request to the at least one target container.

16. The method according to claim 15, wherein in a case where a number of the at least one target container is greater than or equal to 2, the at least one target container comprises a first target container and a second target container, and through the Overlay network, sending the data processing request to the at least one target container comprises:

through the Overlay network, sending the data processing request to the first target container, wherein the first target container is configured to communicate with the second target container through the Overlay network to complete a response to the data processing request, wherein the data processing request comprises a data storing request, a data obtaining request, or a data deleting request.

17. A computing device, comprising a memory, a processor and a computer program stored on the memory and runnable on the processor, wherein the processor, when executing the program, implements a method of deploying a big data cluster, comprising:

displaying a deployment interface;

in response to a node creation operation in the deployment interface, displaying a to-be-deployed node in a temporary resource pool region in the deployment interface, wherein a node is a service comprised in a big data component to provide a data management function;

in response to a drag-and-drop operation on the to-be-deployed node in the temporary resource pool region, displaying the to-be-deployed node in a physical pool in a deployment resource pool region in the deployment interface; and in response to a start deployment operation in the deployment interface, according to the physical pool where the to-be-deployed node is located, creating a container corresponding to the to-be-deployed node on a server corresponding to the physical pool, wherein the container is configured to provide a big data cluster service;

wherein the deployment interface comprises a node creation region, the node creation region comprises a create-node control and at least one big data component, wherein the at least one big data component comprises a Hadoop Distributed File System (HDFS) component, a Yet Another Resource Negotiator (YARN) component, a Hive component or a Clickhouse component, and in response to the node creation operation in the deployment interface, displaying the to-be-deployed node in the temporary resource pool region in the deployment interface comprises:

in a case that one of the at least one big data component is selected, in response to a triggering operation on the create-node control, displaying a to-be-deployed node corresponding to the selected big data component in the temporary resource pool region;

wherein in response to the start deployment operation in the deployment interface, according to the physical pool where the to-be-deployed node is located, deploying the container corresponding to the to-be-deployed node on the server corresponding to the physical pool comprises:

based on the to-be-deployed node and the physical pool in which the to-be-deployed node is located, generating a first request message, wherein the first request message is configured to indicate a deployment of the container corresponding to the to-be-deployed node on the server corresponding to the physical pool;

based on the first request message and at least one deployed container on the server corresponding to the physical pool, determining a deployment operation type corresponding to the to-be-deployed node and a to-be-deleted container in the at least one deployed container, wherein the deployment operation type comprises node adding, node moving, or node unchanging; and according to the deployment operation type corresponding to the to-be-deployed node and the to-be-deleted container in the at least one deployed container, performing a container deployment on the server corresponding to the physical pool.

18. A non-transitory computer-readable storage medium, wherein the storage medium stores a program, and the program when executed by a processor implements a big data cluster based data processing method, comprising:

obtaining a data processing request;

through an Overlay network, sending the data processing request to a container, wherein the container is configured to implement data processing based on the data processing request, the container is configured to provide a big data cluster service, and the big data cluster service is deployed by:

displaying a deployment interface;

in response to a node creation operation in the deployment interface, displaying a to-be-deployed node in a temporary resource pool region in the deployment interface, wherein a node is a service comprised in a big data component to provide a data management function;

in response to a drag-and-drop operation on the to-be-deployed node in the temporary resource pool region, displaying the to-be-deployed node in a physical pool in a deployment resource pool region in the deployment interface; and in response to a start deployment operation in the deployment interface, according to the physical pool where the to-be-deployed node is located, creating a container corresponding to the to-be-deployed node on a server corresponding to the physical pool, wherein the container is configured to provide a big data cluster service;

wherein the deployment interface comprises a node creation region, the node creation region comprises a create-node control and at least one big data component, wherein the at least one big data component comprises a Hadoop Distributed File System (HDFS) component, a Yet Another Resource Negotiator (YARN) component, a Hive component or a Clickhouse component, and in response to the node creation operation in the deployment interface, displaying the to-be-deployed node in the temporary resource pool region in the deployment interface comprises:

in a case that one of the at least one big data component is selected, in response to a triggering operation on the create-node control, displaying a to-be-deployed node corresponding to the selected big data component in the temporary resource pool region;

wherein in response to the start deployment operation in the deployment interface, according to the physical pool where the to-be-deployed node is located, deploying the container corresponding to the to-be-deployed node on the server corresponding to the physical pool comprises:

based on the to-be-deployed node and the physical pool in which the to-be-deployed node is located, generating a first request message, wherein the first request message is configured to indicate a deployment of the container corresponding to the to-be-deployed node on the server corresponding to the physical pool;

based on the first request message and at least one deployed container on the server corresponding to the physical pool, determining a deployment operation type corresponding to the to-be-deployed node and a to-be-deleted container in the at least one deployed container, wherein the deployment operation type comprises node adding, node moving, or node unchanging; and according to the deployment operation type corresponding to the to-be-deployed node and the to-be-deleted container in the at least one deployed container, performing a container deployment on the server corresponding to the physical pool.

* * * * *